(12) United States Patent
Cosentino et al.

(10) Patent No.: US 11,780,567 B2
(45) Date of Patent: Oct. 10, 2023

(54) WINGTIP DEVICE FOR AN AIRCRAFT

(71) Applicant: AIRBUS OPERATIONS LIMITED, Bristol (GB)

(72) Inventors: Enzo Cosentino, Bristol (GB); Catherine Llewellyn-Jones, Bristol (GB); Umberto Polimeno, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 178 days.

(21) Appl. No.: 17/297,880

(22) PCT Filed: Dec. 18, 2019

(86) PCT No.: PCT/EP2019/086130
§ 371 (c)(1),
(2) Date: May 27, 2021

(87) PCT Pub. No.: WO2020/127609
PCT Pub. Date: Jun. 25, 2020

(65) Prior Publication Data
US 2022/0024564 A1    Jan. 27, 2022

(30) Foreign Application Priority Data

Dec. 20, 2018 (GB) .................................. 1820830
Sep. 30, 2019 (GB) .................................. 1914098

(51) Int. Cl.
*B64C 23/06* (2006.01)
*B64C 3/38* (2006.01)
(52) U.S. Cl.
CPC .............. *B64C 23/072* (2017.05); *B64C 3/38* (2013.01)
(58) Field of Classification Search
CPC ....... B64C 23/072; B64C 3/38; B64C 23/065; B64C 3/546
See application file for complete search history.

(56) References Cited

U.S. PATENT DOCUMENTS

| 5,102,068 | A  | 4/1992 | Gratzer |
| 7,744,038 | B2 | 6/2010 | Sankrithi et al. |

(Continued)

FOREIGN PATENT DOCUMENTS

| EP | 2 084 059    | 8/2009 |
| WO | 2008/061739  | 5/2008 |

(Continued)

OTHER PUBLICATIONS

International Search Report and Written Opinion of the ISA for PCT/EP2019/086130 dated Mar. 12, 2020, 13 pages.

*Primary Examiner* — Rodney A Bonnette
(74) *Attorney, Agent, or Firm* — Nixon & Vanderhye P.C.

(57) ABSTRACT

An aircraft wing is disclosed including a closed surface wing tip device which includes an element or actuator within the wing tip for deforming/morphing the shape of the wing tip between geometrical configurations having different aerodynamic properties, for example including one with better overall fuel efficiency for a shorter journey and one with overall fuel efficiency better suited for a longer journey. The device includes a lower winglet with an essentially planar portion spaced apart from the main body of the wing by a blended transition region which is shaped such that the curvature of the local dihedral increases in the outboard direction. The device includes an upper aerofoil structure which with the winglet essentially forms the closed surface. There is also disclosed an aircraft wing tip device having a sigmoid shaped (e.g. S-shaped) aerofoil structure blending in with a main wing of the aircraft.

17 Claims, 18 Drawing Sheets

(56) References Cited

U.S. PATENT DOCUMENTS

| | | | |
|---|---|---|---|
| 2010/0155541 A1* | 6/2010 | Garang | B64C 23/069 |
| | | | 244/199.4 |
| 2012/0049010 A1* | 3/2012 | Speer | B64C 23/069 |
| | | | 244/45 R |
| 2012/0312929 A1* | 12/2012 | Gratzer | B64C 23/065 |
| | | | 244/199.4 |
| 2013/0092797 A1* | 4/2013 | Wright | B64C 3/58 |
| | | | 244/199.4 |
| 2017/0029094 A1 | 2/2017 | Lynas et al. | |
| 2017/0073062 A1 | 3/2017 | Firth | |

FOREIGN PATENT DOCUMENTS

| | | |
|---|---|---|
| WO | 2008/155566 | 12/2008 |
| WO | 2017/185121 | 11/2017 |

\* cited by examiner

WINGTIP DEVICE FOR AN AIRCRAFT

CROSS REFERENCE TO RELATED APPLICATIONS

The present application is a National Phase of International Application Number PCT/EP2019/086130 filed Dec. 18, 2019, which designated the U.S. and claims priority benefits from Great Britain Application Number GB 1820830.6 filed Dec. 20, 2018, and Great Britain Application Number GB 1914098.7 filed Sep. 30, 2019, the entire contents of each of which are hereby incorporated by reference.

BACKGROUND OF THE INVENTION

The present disclosure relates to a wingtip device for an aircraft. More particularly, but not exclusively, this invention concerns a closed surface wing tip device for an aircraft. The invention also concerns an aircraft wing comprising a wing tip device, and a method of operating an aircraft including a pair of wing tip devices for example.

The efficiency of a fixed wing aircraft can be improved by the addition of a wingtip device. Such devices typically improve aerodynamic performance by means of reducing induced drag that would otherwise be caused by vortices downstream of the wingtip of the aircraft wing. One such wingtip device is used on the Airbus A320 Neo, the device commonly being referred to as a "sharklet". The extra mass that is added by such a sharklet can exceed 100 kg, yet the addition of a sharklet can still provide significant fuel efficiency advantages despite such extra mass. Much of the mass of a sharklet is at the outboard end of the wing tip device, due to the vertical planar region at the outboard end. Much of the total mass of the sharklet is dictated by the need for sufficient structural strength over the whole device.

It has previously been proposed that a spiroid shaped wingtip device might provide improved performance. An early proposal concerning a "spiroid tipped wing" was the subject of U.S. Pat. No. 5,102,068.

US2017/0029094 discloses an aircraft wing having a strut-braced wing tip device. The wing tip device is rotatable about a pivot, by the strut moving laterally on the wing tip surface.

US 2017/0073062 purports to disclose a variable geometry wingtip having an upper aerofoil surface and a lower aerofoil surface which, according to the disclosure, change shape according to the flight conditions of the aircraft. For example it is suggested that a ram air effect between the two aerofoil surfaces acts to inflate the structure, leading to increased stability. There are no moving parts in the upper aerofoil structure. The inventors of the present application have doubts over the feasibility of constructing a wingtip device in accordance with US '062, for use on a commercial passenger aircraft. It appears that the proposals of US 2017/0073062 are directed more towards gliders, not large independently powered aircraft.

WO2008155566A1 discusses a winglet having a long planar portion immediately outboard of the inboard end of the wing tip device. Outboard of the long planar portion is a curved portion which curves through a 90 degree curve and which terminates in a vertical planar portion. At the tip of the planar portion is a further curved section which curves back through at least 90 degrees to a position perpendicular or at a decline to the vertical planar portion.

It is generally desired to improve the fuel efficiency of an aircraft. This may typically be achieved by a combination of improving aerodynamic efficiency and/or reducing mass. Thus, any devices added to the aircraft in order to improve aerodynamic efficiency should ideally do so in a way that either does not increase mass or provides an overall benefit despite an overall increase in mass. It may be desirable to obtain a preferential distribution of mass in the wing tip device, and to bear in mind the effect of extra outboard mass on the loads sustained at the root of the wing. Consideration may need to be given to distributing mass of the wingtip so that its centre of gravity is located as far inboard as is feasible, bearing in mind other factors, such as aerodynamic benefits. One added complication is that optimising fuel efficiency for take-off conditions of an aircraft might result in a solution that is not optimised for the aircraft when flying at cruising altitude, and vice versa.

The present invention seeks to mitigate one or more of the above-mentioned problems. Alternatively or additionally, the present invention seeks to provide an improved wingtip device for an aircraft. Alternatively or additionally, the present invention seeks to provide a way in which the fuel efficiency of an aircraft might be improved.

SUMMARY OF THE INVENTION

The present invention provides according to an aspect of the invention a wing tip device for an aircraft, preferably including a closed surface.

In embodiments, an aircraft wing comprises a main body having an outboard end and a wing tip device extending from the outboard end of the main body of wing. The wing tip device may comprise at least one aerofoil, for example a main aerofoil. The main aerofoil may have a first portion extending across a significant portion of the total length of the wing tip device (for example at least 25% of the total length of the wing tip device and optionally 30% or more). In the context of the present invention, the length of the main aerofoil is measured in the outboard direction along the uppermost surface at the median chord line of the main aerofoil (i.e. such that the length of the main aerofoil will be greater than the straight line separation of the root from the tip). The first portion may be shaped such that the angle of the local dihedral varies, with increasing distance in the outboard direction, from a value of less than +40 degrees, optionally less than +30 degrees (and possibly less than +20 degrees) at an inboard location to a value that is at least 25 degrees greater, possibly at least 30 degrees greater, at an outboard location. For example, the first portion may be shaped such that the angle of the local dihedral reaches a value of greater than +45 degrees, possibly greater than +50 degrees at an outboard location. Preferably, the local dihedral varies gradually and/or monotonically for substantially the entire extent of the first portion. The main aerofoil may also have a second portion outboard of the first portion. The second portion may also extend across a significant portion of the total length of the wing tip device (for example extending across at least 25% of the total length of the wing tip device, and optionally 30% or more). The second portion may be shaped such that the angle of the local dihedral varies, with increasing distance in the outboard direction, from a value at an inboard location that is the same or higher than the maximum dihedral of the first portion (e.g. an angle of greater than +45 degrees, possibly greater than +50 degrees) to a value that is lower by at least 25 degrees, possibly to a value that is at least 30 degrees lower. For example, the second portion may be so shaped that the angle of the local dihedral drops to a value of less than +40 degrees, optionally less than +30 degrees (and possibly less than +20 degrees) at an outboard location. Preferably, the local dihedral varies gradually and/or monotonically for substantially the entire extent of the second portion. The main aerofoil may have a maximum angle of the local dihedral of less than 90 degrees, possibly less than 85 degrees, for example 75 degrees or less. It will be understood that the dihedral angle is the angle as measured when the aircraft is on the ground at rest with the wing tip device adopting the first geometrical configuration. If the angle of inclination of the wing surface varies according to the chordwise position at which it is measured and/or on which of the upper and lower surfaces of the wing tip device is used to define the angle, then the dihedral angle may be taken as the angle when measured with reference to the surface midway between the upper and lower surfaces of the body concerned and as averaged across the chordwise direction.

The main aerofoil may follow a sigmoidal profile when viewed from the front and/or rear (i.e. when viewed in a direction which is parallel to the line of flight). The main aerofoil following a sigmoidal profile may have advantages over prior art wing tip devices through induced drag reduction, weight reduction and/or preferential mass distribution. A wing tip device with a main aerofoil having a sigmoidal profile may advantageously have a greater proportion of the mass of the winglet inboard in comparison to a "sharklet" wing tip device. A wing tip device with a main aerofoil having a sigmoidal profile may have advantages structurally over a traditional sharklet. It may be that a wing tip having a sigmoidal profile may be mounted to a wing rib inboard of the wing rib to which a sharklet would be mounted. A wing tip device with a main aerofoil having a sigmoidal profile may be easier to manufacture.

The term "sigmoid", or "sigmoidal" is used throughout this description to refer to the overall shape of the wing tip device. It will be appreciated that the shape essentially follows a characteristic "S"-shape. It will thus be understood that the shape need not follow exactly a shape that would be deemed as being mathematically identical to a curve defined by a sigmoid function. A sigmoid has two curved sections separated by a transition section. The gradient of the sigmoid line may always be non-negative (i.e. zero or positive). The wing tip device on the port side of the aircraft may have a sigmoidal profile when viewed from the front. The wing tip device on the starboard side of the aircraft may have a sigmoidal profile when viewed from the rear. The wing tip device may be referred to as a "swanlet" owing to its "S"-shaped profile.

The wing tip device may have a shape when viewed in a line-of-flight direction that resembles the letter "S" with a horizontal skew which increases the distance between the start and end of the letter (e.g. a shape that looks like the letter "S" having been stretched apart by its free ends). The wing tip device is preferably sufficiently structurally rigid that it retains the same overall shape (i.e. having an S-shaped profile) in all flight conditions, yet sufficiently flexible to morph and/or flex when subjected to typically operational loads and/or displacements.

The wing tip device may have a root portion, a first curved portion, an optional intermediate portion (for example comprising a transition portion), and a second optionally curved portion and a tip. The root portion may be inboard of (and preferably directly adjacent to) the first curved portion, which in turn may be inboard of (and preferably directly adjacent to) the transition portion, which in turn may be inboard of (and preferably directly adjacent to) the second portion (e.g. second curved portion), which in turn may be inboard of (and preferably directly adjacent to) the tip. These portions (and the tip) may be portions of the main aerofoil, preferably making up substantially the entire main aerofoil. The first curved portion may be curved in an opposite direction to a curve of the second portion. In comparison to a traditional "sharklet", in an embodiment of the present invention, the lowest radius of curvature of the first curved portion of the wing tip device may be significantly greater than the lowest radius of curvature of the curved section in the sharklet. The lowest radius of curvature of the first curved portion may be greater than 0.75 m, optionally greater than 1 m, and possibly greater than 1.5 m.

It may be the case that at all points on the first curved portion of the wing tip device (of embodiments of the present invention), the angle of the local dihedral is less than +75 degrees. A sharklet (of the prior art) has a first planar portion, a curved portion and a second planar portion. The first curved section of a wing tip device of embodiments of the present invention may start at the end of the root portion of the wing tip device. The root portion may be less than 10% of the length of the wing tip device. The root portion may be less than 5% of the length of the wing tip device. The first curved portion may be defined as the portion of the main aerofoil between the location at which where the dihedral increases from the dihedral of the outboard end of the fixed wing and the location at which the dihedral stops increasing in the outboard direction. The transition portion may begin where the first curved portion reaches the maximum angle of local dihedral of the main aerofoil. The second curved portion may curve in an opposite way to the first curved portion. The maximum angle of the local dihedral in the second portion may be less than +75 degrees (the maximum being at an inboard location). The minimum angle of the local dihedral in the second portion may be more than 0 degrees (the minimum angle being at an outboard location). The second curved portion may terminate at a dihedral of less than +10 degrees, or less than +5 degrees. The second curved portion may end at an angle relative to the horizontal axis of about 0 degrees, for example more than −5 degrees, optionally more than +1 degrees.

It may be that the first portion and the second portion of the aircraft wing are directly adjacent to each other, the junction between them including a point of inflection for example. Alternatively, it may be that the first portion and the second portion of the aircraft wing are joined by an intermediate portion extending across at least 10% of the total length of the main aerofoil. It may be that the intermediate portion includes an essentially planar portion (i.e. having a constant dihedral within +/−1 degrees) extending across at least 10% of the total length of the main aerofoil. It may be that the intermediate portion includes both an inboard region in which the local dihedral increases in the outboard direction and an outboard region in which the local dihedral decreases in the outboard direction. It may be that the essentially planar portion extends across no more than 20% of the total length of the main aerofoil. The intermediate portion may have a length between 10% and 30% of the total length of the main aerofoil. It may be that the first portion, second portion and intermediate portion together extend along at least 90%, possibly at least 95%, of the length of the main aerofoil and optionally along substantially the entire length of the main aerofoil. The intermediate portion may have features of the above described transition portion and/or vice versa.

It may be that the main aerofoil terminates at a substantially horizontal tip. It may be that the outboard end of the main aerofoil is a substantially horizontal tip.

Preferably, the local dihedral varies gradually for substantially the entire extent of the main aerofoil of the wing tip device. For example, it may be that the magnitude of the rate of change of the dihedral angle with increasing distance in the outboard direction is such that the maximum variation in angle over any portion of the main aerofoil extending along 10% of the length of the main aerofoil (as measured in the outboard direction along the uppermost surface of the main aerofoil) is less than 40 degrees, optionally less than 30 degrees, and possibly less than 25 degrees. It may be that there is no portion of the main aerofoil for which the local dihedral angle changes by more than 15 degrees over a distance of 5% of the total length of the main aerofoil. It may be that there is no portion of the main aerofoil for which the local dihedral angle changes by more than 60 degrees (possibly more than 50 degrees) over a distance of 20% of the total length of the main aerofoil.

It may be that the wing comprises a blended region blending between the first portion of the wing tip device and the outboard end of the main body of wing. It may be that the wing comprises a blended region blending between the first portion of the main aerofoil and the outboard end of the main body of wing. The chordwise cross-section of the main aerofoil at an inboard end of the wing tip device may be substantially identical to the chordwise cross-section of the outboard end of the fixed wing. The chordwise cross-section of the wing tip device at an inboard end of the wing tip device may be substantially identical to the chordwise cross-section of the outboard end of the fixed wing.

The main aerofoil of the device may have a shape that includes a twist (for example so that there is a change in angle between two spaced apart chord lines).

The height (vertical dimension) of the wing tip device may 2.5 meters or less. The height of the wing tip device may be greater than 0.75 meters. The height of the wing tip device may be between 0.75 meters and 2 meters. The length of the wing tip device may be up to 4 meters. The straight-line distance between the root portion and the tip may be between 2.5 meters and 4 meters.

It may be that the height of the main aerofoil never decreases in the outboard direction. Advantageously, this may reduce or prevent detachment of airflow from the aerofoil surface and have consequential benefits in preventing stalling and/or reducing induced drag.

The inboard face of the wing tip device may connect to an outboard face of a fixed wing of the aircraft. The chordwise cross-section of the main aerofoil at an inboard end of the wing tip device may be substantially identical to the chordwise cross-section of the outboard end of the fixed wing.

The main body of the wing may be understood to be the "fixed wing".

The wing tip device may comprise a main aerofoil and a supporting structure, for example the main aerofoil being separately discernible from the supporting structure. The wing tip device may be braced by the supporting structure. The supporting structure may extend from the first portion or a position inboard of the first portion to the second portion or a position outboard of the second portion. The supporting structure may extend below the wing tip device. The supporting structure may extend below the main aerofoil. The supporting structure may be so shaped that its chordwise dimension at any position along at least 90% of its length is less than the chordwise dimension of the main aerofoil at the same position in the spanwise direction. The supporting structure may be so shaped that for at least 90% of its length the angle of the local dihedral varies monotonically from a value of greater less than +20 degrees at an inboard location to a value of greater than +70 degrees at an outboard location. The supporting structure may attach at a point which is in the same plane as the wing. The supporting structure may extend in the outboard direction from a region on the underside of the main aerofoil which is substantially coplanar with the main body of the wing. The supporting structure may assist in strengthening the main aerofoil in a way that enables the main aerofoil to be lighter. The supporting structure may also assist in reducing flexure of the main aerofoil during use, in a way that reduces delamination or other damage of the wing tip device in the region of the junction with the main wing for example.

It may be that the supporting structure is so shaped that with increasing distance in the outboard direction the maximum change in angle over any portion of the supporting structure extending across 10% of its length is less than 30 degrees, possibly less than 25 degrees.

The wing tip device may further comprise a structural support. The supporting structure may comprise the structural support. The structural support may comprise a strut, for example a bracing member.

It may be that less than 25% of the length of the trailing edge of the structural support extends rearwards of the trailing edge of the main aerofoil. It may be that less than 10% of the length of the trailing edge of the structural support extends rearwards of the trailing edge of the main aerofoil. It may be that there are no spanwise positions, at which the trailing edge of the structural support extends rearwards of the trailing edge of the main aerofoil.

The main aerofoil may entirely overlay the supporting structure when viewed along the centreline of the wing. The supporting structure may occupy a volume of space which is less than half the volume of space occupied by the main aerofoil.

The supporting structure may be aerodynamically shaped. The supporting structure may be a secondary aerofoil structure. The main aerofoil and the supporting structure may together form a closed surface wing tip device (e.g. a closed loop wing tip device).

The structural support may extend between an inboard end and an outboard end of the main aerofoil on the underside of the wing tip device. In the case where the main aerofoil has a sigmoidal profile, the structural support may extend from the base of the sigmoid to the top of the sigmoid. The structural support may attach to the main aerofoil at a point which is in the same plane as the wing. The structural support may attach at the tip of the outboard end of the main aerofoil. The structural support may attach at a point inboard of the tip of main aerofoil. At the outboard end of the wing tip device the structural support may be attached normal (i.e. at or close to perpendicular) to the main aerofoil. At the inboard end of the wing tip device the structural support may be attached at an acute angle to the main aerofoil. The structural support may be attached at its inboard end to the underside of the first curved portion of main aerofoil. The structural support may be attached at its outboard end to the underside of the tip of the main aerofoil. The structural support may have a single curved portion which curves in one direction only (i.e. monotonically varying gradient) and which accounts for at least 90% of the length of the structural support. The curved portion of the structural support may be shaped such that the separation from the main aerofoil increases to a maximum and then decreases. The structural support may follow a substantially constant curve. The dihedral of the structural support may increase in the outboard direction. The structural support and the main aerofoil may define an airflow hole and/or airflow channel. The curvature of the structural support may provide for a relatively large airflow hole/channel without extending outboard of the main aerofoil. The structural support may extending outboard of the main aerofoil, of at all, by less than 10% of the length of the wing tip device. The curvature of the structural support may be shaped so as to assist with the support given to the main aerofoil by the structural support.

There may be a junction between the main aerofoil and the supporting structure. The main aerofoil and the supporting structure may together, possibly with other parts, form a closed loop, for example corresponding to the closed surface of a closed surface wing tip device. In some embodiments, the main aerofoil and the supporting structure may be joined by a blended region, there being no easily discernible single junction between the main aerofoil and the supporting structure. The main aerofoil and the supporting structure may be connected at two separate spaced apart regions, such that together they form the closed surface. It may be that a joint is formed between the main aerofoil and the supporting structure of the wing tip device. Such a joint may be a fixed joint. Such a joint may be a pivoting joint. The wing tip device may include an overhang portion, for example at the tip of the wing tip device. Thus, in some embodiments, one or both of the main aerofoil and the supporting structure may form a part of the wing tip device, which is not also a part of a closed surface. The wing tip device may be rigidly attached to the main wing, for example via one or more bolts or other fixings, and thus—for example—not being pivotally mounted to the main wing.

The main aerofoil of the device may have a maximum dimension in the chordwise direction that is between 120% and 500% of the maximum dimension in the chordwise direction of the supporting structure. The supporting structure may be significantly less massive than the main aerofoil. For example, the supporting structure may have a mass that is less than half of the mass of the main aerofoil, optionally less than less than one third of the mass of the main aerofoil, possibly less than 20% of the mass of the main aerofoil. It may be that the mass is greater than 10% of the mass of the main aerofoil.

The structural support and the main aerofoil have leading and trailing edges. It may be that the foremost point of the leading edge of the structural support does not extend forwards of the foremost point of the leading edge of the main aerofoil. It may be that the aftmost point of the trailing edge of the structural support does not extend rearwards of the aftmost point of the trailing edge of the main aerofoil.

The structural support may be a lower structure and the main aerofoil may be an upper structure. It may be that the foremost point of the leading edge of the lower structure does not extend forwards of the foremost point of the upper structure of the wing tip device. It may be that the aftmost point of the trailing edge of the lower structure does not extend rearwards of the aftmost point of the upper structure of the wing tip device.

It may be that the main aerofoil substantially overlays the structural support when viewed from above. It may be that the main aerofoil entirely overlays the structural support when viewed in the outboard direction along the centreline of the wing.

The structural support may be a secondary aerofoil structure. It may be that the structural support is aerodynamically shaped to reduce/minimise drag. It may be that the structural support is aerodynamically shaped to provide lift.

The wing tip device may include an element within the wing tip device which is arranged to deform the shape of the wing tip device, for example when the aircraft is stationary and on the ground. There may be more than one such element within the wing tip device. The one or more elements may be configured to deform the shape from a first geometrical configuration to a second geometrical configuration, for example such that the second geometrical configuration has different aerodynamic properties from the first geometrical configuration. It will be observed that the proposals shown in US 2017/0073062 shows a morphing wing tip in which the shape of the wing tip is varied by means of an upper aerofoil retracting into/extending from an upper surface of the outboard end of the wing which is inboard of the wing tip device. The wing tip of US 2017/0073062 does not therefore appear to use any elements within the wing tip device to change the shape of the wing tip device.

The supporting structure (or the structural support) may comprise an actuator arranged to alter the shape of the main aerofoil.

Embodiments of the present invention, for example an aircraft featuring such wing tip devices, may enable the aerodynamic performance of the aircraft to be adjusted to suit a typical set of flight conditions. On a given occasion, the wing tip device may for example be set to optimise fuel efficiency for a short haul flight where fuel consumption during take-off has a greater effect on overall fuel efficiency than fuel consumption during steady state cruise mode. On a different occasion, the wing tip device may for example be set to optimise fuel efficiency for a longer haul flight where fuel consumption during steady state cruise mode has a greater impact.

It may be that at least one point on the wing tip device outer surface is displaced by at least 10 mm, preferably by at least 50 mm, and possibly by more than 100 mm, as between the first and second geometrical configurations. There may be many different geometrical configurations of the wing tip device.

The one or more elements may be arranged to be able to deform actively the overall shape of the wing tip device while the aircraft is in flight. It may be that the wing tip device is arranged such that the one or more elements deform the shape of the wing tip device while the aircraft is stationary and on the ground. It may for example be the case that a particular configuration of the wing tip device is selected before the aircraft takes off for a particular destination.

The shape of the wing tip device may be arranged to be deformed with two degrees of freedom. For such a feature, it may be preferred to have more than one independently movable element for deforming the shape of the wing tip device.

The one or more elements may be arranged to deform the overall shape of the wing tip device by means of an elastic deformation of the wingtip device. The one or more elements may be arranged to deform the overall shape of the wing tip device such that substantially the majority of the outer surfaces, by surface area, are displaced from one configuration to another. The wing-tip device may for example undergo a global, or macroscopic, deformation of substantially its entire shape. The wing-tip device may comprise a morphing surface. Although the shape of the wing tip device may change due to the force applied by the element within the supporting structure, the main aerofoil is preferably configured to maintain a sigmoidal profile. It may be that the sigmoidal profile of the wing tip device is stretched or contracted in the horizontal direction and/or the vertical direction.

The element may be arranged to exert a range of forces wherein the difference between the maximum force and the minimum force is greater than 100 N. The element may be under tension when exerting the force. The element may for example comprise one or more cables. The element may for example comprise one or more links, chains, hinged portions, or the like. The element may be under compression when exerting the force. The element may for example comprise one or more actuators. The element may for example comprise one or more pistons, rods, or the like. The element may directly exert a force at various positions along the spanwise length of the wing tip device. The element may be substantially enclosed by the outer skin of the wingtip device, for example such that no part of the element is directly exposed to airflow when the device is in use on an aircraft in flight.

Above, there is disclosure of a main aerofoil (e.g. a primary aerofoil structure) and a supporting structure (which may be in the form of a secondary aerofoil structure) which together form an arrangement which functions as a closed surface wing tip device (e.g. a closed loop wing tip device). Thus, there is disclosure of a closed surface wing tip device for (or as part of) a fixed wing of an aircraft, the device comprising a primary aerofoil structure and a secondary aerofoil structure, which provides structural support for the primary aerofoil structure and/or comprises one or more moveable elements contained within the body of the secondary aerofoil structure which are arranged to morph the shape of the secondary aerofoil structure, the morphing of the shape of the secondary aerofoil structure causing morphing of the shape of the primary aerofoil structure. One possible configuration of such an arrangement has the main aerofoil (e.g. the primary aerofoil structure) located above the supporting structure (e.g. the secondary aerofoil structure). Another configuration of such an arrangement has the main aerofoil (e.g. the primary aerofoil structure) located below the supporting structure (e.g. the secondary aerofoil structure). In both such arrangements, there may therefore be a portion or part of the wing tip device that forms a lower section and a different portion or part of the wing tip device that forms an upper section. There now follows disclosure of a wing tip device having such a lower section and an upper section.

The wing tip device may comprise a lower section and an upper section, for example the lower section being separately discernible from the upper section. There may be a junction between the upper section and the lower section. The upper section and the lower section may together, possibly with other parts, form a closed loop, for example corresponding to the closed surface of the closed surface wing tip device. In some embodiments, the lower section and the upper section may be joined by a blended region, there being no easily discernible single junction between the upper section and the lower section. The upper section and the lower section may be connected at two separate spaced apart regions, such that together they form the closed surface. It may be that a joint is formed between the upper section and the lower section of the wing tip device. Thus, in some embodiments, one or both of the upper section and the lower section may form a part of the wing tip device, which is not also a part of the closed surface.

The lower section of the closed surface of the wing tip device may be in the form of a winglet, for example a blended winglet. In certain embodiments of the invention, the lower section of the wing tip device is designed primarily having in mind the desire to reduce lift-induced drag caused by wingtip vortices. The winglet may for example resemble the overall shape and have substantially the same aerodynamic function as the so-called "sharklets" provided for use on Airbus A320/A320Neo, A330/330Neo and A350 aircraft.

The winglet (of the lower section) may be in the form of the wing tip device/shape as described and claimed in EP2084059. The contents of that application are fully incorporated herein by reference. The claims of the present application may incorporate any of the features disclosed in that patent application. In particular, the claims of the present application may be amended to include (in relation to the shape and functionality of the aforementioned winglet) features relating to the claimed wing tip shape for a wing as set forth in EP2084059A as published. For example, the winglet may comprise an essentially planar outboard portion and an inboard transition region which is shaped such that the curvature of the local dihedral increases in the outboard direction. It may also be that said curvature characteristic is present at any curve formed by constant chordwise points in the transition region along the spanwise dimension.

The winglet may have a first portion having a first dihedral angle and a second portion, outbound of the first portion, having a second higher dihedral angle. The first portion of the winglet may account for at least 25% of the winglet's spanwise length. The second portion of the winglet may account for at least 25% of winglet's spanwise length. The second dihedral angle may be at least 30 degrees higher than the first dihedral angle. The first dihedral angle may be greater than −5 degrees. The first dihedral angle may be positive. The first portion of the lower section may have a dihedral angle of less than +20 degrees, for example over a spanwise length of more than 100 mm, preferably more than 250 mm and optionally more than 500 mm. The second portion may have a dihedral angle of greater than +60 degrees, for example over a spanwise length of more than 100 mm, preferably more than 250 mm and optionally more than 500 mm. (It will be appreciated that the first portion may have a negative dihedral angle, at least in part, which might be referred to as a positive and anhedral angle). The lower section of the closed surface of the wing tip device may have no portion that has an anhedral angle greater than 5 degrees. The first portion of the lower section may have a dihedral angle of less than +20 degrees over more than 25% of its spanwise length. The second portion may have a dihedral angle of greater than +60 degrees over more than 25% of its spanwise length.

The upper section of the closed surface of the wing tip device may extend from a region in the first portion of the lower section to a region in the second portion of the lower section. The upper section may be in the form of an aerofoil surface. The overall dimensions of the upper section of the closed surface may be similar to those of the lower section. The upper section of the closed surface may have a maximum dimension in the chordwise direction that is between 50% and 200% (possibly greater than 75%, optionally greater than 80%, possibly less than 150%) of the maximum dimension in the chordwise direction of the lower section. The upper section of the closed surface may be significantly less massive than the lower section however. For example, the upper section of the closed surface may have a mass that is less than two thirds of the mass of the lower section, optionally less than less than half of the mass of the lower section, possibly less than 40% of the mass of the lower section. It may be that the mass is greater than 20% of the mass of the lower section.

The closed surface may be in the form of a spiroidal wing tip device.

The upper section of the closed surface of the wing tip device may have a height (e.g. measured as the vertical component of the distance above the root of the wing tip device) which is between 50% and 200% (possibly greater than 75%, optionally greater than 80%, possibly less than 150%) of the height of the lower section. The lower section of the closed surface of the wing tip device may have a height of at least 250 mm, preferably at least 500 mm and optionally greater than 750 mm.

The upper section of the closed surface of the wing tip device may have a spanwise extent which is between 50% and 200% (possibly greater than 75%, optionally greater than 80%, possibly less than 150%) of the spanwise extent of the lower section.

The wing tip device may be so shaped that in its first configuration there is a point on the lower surface of the upper section for which the shortest distance to the nearest point on the lower section is greater than 10%, preferably at least 20%, and optionally greater than 30% of the height of whichever is higher of the upper section and the lower section. The wing tip device may be so shaped that in its first configuration there is a point on the lower surface of the upper section for which the shortest distance to the nearest point on the lower section is greater than 10%, preferably at least 20%, and optionally greater than 30% of whichever is longer of the spanwise extent of the upper section and the lower section.

The wing tip device may be so shaped that in its first configuration there is a point on the lower surface of the upper section for which the shortest distance to the nearest point on the lower section is greater than 250 mm away, preferably at least 500 mm away, and optionally greater than 750 mm away.

The first portion and the second portion of the lower section may be joined by a blended portion.

The upper section of the wing tip device may have a portion having a dihedral angle of greater than +30 degrees, and preferably greater than +45 degrees, over a spanwise length of more than 250 mm, preferably more than 500 mm and optionally more than 750 mm.

Certain embodiments of the present invention may have application where the main aerofoil (e.g. the lower section or the upper section; for example the lower section when the lower section is in the form of a sharklet device or the upper section when the upper section is in the form of a swanlet device) is provided primarily to perform the function of a winglet whereas the other section (for example, supporting structure) is provided primarily to perform the function of bracing the winglet and/or actively manipulating the aerodynamic shape of the winglet. Said other section (e.g. the upper section and/or the supporting structure) may be actively moveable (by integrated actuators for example) whereas the main aerofoil (e.g. the lower section and/or the winglet) may be a passive structure having a global shape that is adaptable by external forces. This may simplify design and manufacture of a new aircraft wing. The core design may be based on an existing (e.g. passive, but reasonably flexible/elastically deformable) winglet structure which is then modified to reduce its strength and/or mass in view of the bracing that is able to be provided by an upper or lower section (e.g. an active section) that is added, and which upper or lower section can be controlled/activated to morph the shape of the winglet structure. The benefits of embodiments of the invention can then be provided with greater ease than a complete redesign of the wing. In some embodiments, the upper or lower section could be provided as a retrofitted to an existing winglet.

In certain embodiments of the invention, said other section (e.g. the supporting structure) of the wing tip device is designed primarily having in mind one or more of (i) a desire to reduce mass of the main aerofoil, by providing structural strength by using the other section as a support strut and (ii) a desire to provide a means of controllably deforming the shape of the main aerofoil by means of one or more elements contained in said other section. In certain embodiments, the one or more elements may be contained only within said other section, for example the upper section and/or said supporting structure. This arrangement may simplify the aircraft wing design process. Said other section, for example the upper section and/or said supporting structure may have a mass greater than 10 Kg.

The upper section of the wing tip device may be a morphing structure, the shape to which the upper section is morphed being controllable by the one or more elements contained within the upper section. The shape adopted by the lower section of the wing tip device may depend on and be controlled by the shape to which the upper section is morphed. The lower section of the wing tip device may be a morphing structure, the shape to which the lower section is morphed being controllable by the one or more elements contained within the lower section. The shape adopted by the upper section of the wing tip device may depend on and be controlled by the shape to which the lower section is morphed. The shape adopted by the main aerofoil of the wing tip device may depend on and be controlled by the shape to which the supporting structure is morphed. For example, the shape to which the main aerofoil is morphed may be controllable by one or more elements contained within the supporting structure.

There may be elements for deforming the shape of the wing tip device in both the upper and the lower sections. The upper section of the wing tip device may have a spanwise length that can be controllably changed (increased or decreased) by the one or more elements contained within the upper section. The wing span of an aircraft featuring wing tip devices according to embodiments may be controllably changed (increased or decreased) by the one or more elements contained within the upper and/or lower sections of the wing tip device.

It may be that the or each morphing aerofoil structure morphs shape without any significant change to its overall size. This is in distinction to the proposals shown in US 2017/0073062, which, even if workable in practice (which seems unlikely) on a commercial aircraft, require the upper aerofoil to extend and retract in order to cause a change in shape in the lower aerofoil.

The wing tip device may be so arranged that when installed on an aircraft and viewed in the direction of the longitudinal axis of the aircraft, there is a first notional straight line joining (a) the region of the (inboard) junction between the lower section and the upper section (i.e. at the region in the first portion of the lower section) and (b) the region of the (outboard) junction between the lower section and the upper section (i.e. at the region in the second portion of the lower section. There may also be a second notional line which defines the average extent and overall shape of the lower section. The first notional line may form at one end a first included angle with the second notional line, the included angle for example being greater than 20 degrees, for example greater than 30 degrees. The first notional line may additionally form at the opposite end a second included angle with the second notional line, the second included angle for example being greater than 20 degrees, for example greater than 30 degrees.

According to a further aspect of the invention there is provided a closed surface morphing winglet for an aircraft (for example a non-planar winglet). The shape of the morphing winglet is preferably internally reconfigurable, for example by mean of (re-) configuring something inside the winglet. The shape of the morphing winglet may be controlled by means of an internal mechanism, for example one or more elements as described herein.

The present invention provides, according to a yet further aspect, a wing tip device of or for a wing of an aircraft. The wing tip device may be a wing tip device for use in other aspects of the invention described or claimed herein. The wing tip device may comprise a main aerofoil structure, which follows a sigmoidal profile when viewed in a line-of-flight direction. The wing tip device may be configured so as to be suitable for, or configured to form at least part of, the wing tip device of the aircraft wing of the other aspects of the invention described or claimed herein.

According to a further aspect of the invention there is provided an aircraft wing comprising a main body, a winglet at an outboard end of the wing, an upper aerofoil structure, and a closed loop at the wing tip formed at least in part by at least part of the winglet and at least part of the upper aerofoil structure, the upper aerofoil structure having an actively controllable shape and/or length, which acts in use to manipulate the shape of the winglet by loading the winglet to cause elastic deformation of the winglet from a first aerodynamic configuration suitable for a short-haul flight over a first distance to a second different aerodynamic configuration better suited for a flight over a second distance different from the first difference. One of the first and second distances may be more than twice the other. The winglet may have an outboard portion, for example an essentially planar portion, spaced apart from the main body by a blended transition region. The dihedral of the outboard portion of the winglet may be higher than a dihedral of the transition region. The transition region may be shaped such that the curvature of the local dihedral increases in the outboard direction. The upper aerofoil structure may extend between a position outboard of a location between the outboard (e.g. essentially planar) portion and the blended transition region to a position inboard of that location.

According to a yet further aspect of the invention there is provided an aircraft wing incorporating or otherwise comprising a wing tip device or a winglet or wing according to other aspects of the invention as described or claimed herein. There is also provided an aircraft comprising such a wing. The aircraft may be a single aisle aircraft. The aircraft may be a passenger aircraft, for example an aircraft configured to carry more than 50 passengers, for example more than 100 passengers, possibly at least 200 passengers For the purposes of the present specification the term commercial passenger aircraft also covers aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

According to another aspect of the invention there is provided a method of operating an aircraft, for example flying an aircraft. The aircraft may include a pair of wing tip devices, winglets, or wings according to other aspects of the invention as described or claimed herein, for example closed surface wing tip devices, on opposite sides of the aircraft. The aircraft may for example be in accordance with the aspect of the invention mentioned above. The aircraft comprises wings which each include a wing tip device, for example according to any aspect of the invention as described and claimed herein. The wing tip device may have a sigmoid-shaped upper aerofoil extending from a root to a tip. The root of the wing tip device may be located at, for example blending in with, the outboard end of a main wing structure. The method may include using an aerofoil (e.g. an upper aerofoil) to reduce the drag that would otherwise be induced by wingtip vortices, and providing support to that aerofoil with a separate support member. The support member is preferably aerodynamically shaped. The support member may extend beneath the upper aerofoil, for example from an inboard location at or proximate to the root of the wing tip device to an outboard location at or proximate to the tip of the wing tip device.

The method may include deforming the shape of each wing tip device from a first geometrical configuration in which the wing tip devices are set up in a manner to suit a first flight profile, for example in accordance with a given planned destination and route, to a second geometrical configuration in which the wing tip devices are set up in a manner to suit a second flight profile, different from the first flight profile (for example having a different route, planned flight time, distance or the like). In certain embodiments, it may be possible for the fuel efficiency of the aircraft if set up in the second configuration to be worse for the first flight than when set up in the first configuration, and for the fuel efficiency of the aircraft if set up in the first configuration to be worse for the second flight than when set up in the second configuration. For example, the first configuration may suit short-haul flights over particularly short distances, whereas the second configuration may suit longer distance flights.

The aircraft may be one incorporating any other aspect of the invention as described or claimed herein.

The present invention also provides, according to a further aspect, a method of manufacturing an aircraft having a wing tip device according to any other aspect of the invention. The wing tip device may be retro-fitted to the aircraft. The method may comprise a step of attaching an aircraft wing according to any other aspect of the invention to an aircraft fuselage.

It may be that the step of deforming the shape of the wing tip device includes exerting a force sufficient to elastically deform the shape an outboard portion of the wing, for example of the wing tip device or of the winglet as described above, such that at least one point on the outer surface is displaced by at least 10 mm.

It may be that tip of the wing tip device has a range of operational positions that have a maximum dihedral and a minimum dihedral. It may be that the maximum dihedral and the minimum dihedral have the same sign (i.e. either both positive or both negative). It may be that the difference between the maximum dihedral and the minimum dihedral is less than 180 degrees, preferably less than 135 degrees, and optionally less than 90 degrees.

It may be the wing tip device (having both a lower section and an upper section) has a range of operational positions such that each of the lower section and the upper section has a maximum length and a minimum length (the length being measured in the outboard direction from root to tip of the section, along a median chord line on a surface of the section, namely the upper surface of the upper section or the lower surface of the lower section). It may be that the difference, if any, between the maximum length and the minimum length is no more than 25%, preferably by no more than 10%, of the minimum length. By way of contrast, the proposals shown in US 2017/0073062, require the upper section of the wing tip device to extend from the fixed wing portion of the wing from a retracted high speed spiroid like shape to a fully extended aerofoil, in which a ground effect shape may be formed. The length of the upper section when in the fully extended ground effect shape is more than 150% of the length of the upper section when in the retracted high speed spiroid-like shape. The proposals shown in US 2017/0073062 thus require the wing tip to have extreme changes in its dihedral angle (as a result of extreme changes in overall shape of the wing tip device) to an extent that would be impractical in relation to a wing tip device for a commercial aircraft.

The main aerofoil of the present invention may comprise internal stiffeners, for example a bracing structure, ribs and/or spars. The supporting structure may comprise internal stiffeners, for example a bracing structure, ribs and/or spars. It may be that the main aerofoil and/or the supporting structure are of a thickness which gives structural rigidity.

There may be features of the above described invention that have benefit separately from the ability to change the shape of the wing tip device. There may for example be beneficial embodiments of the invention not including any internal elements actuators or the like for morphing the shape of the wing tip device.

There now follows various clauses defining subject matter that form part of the present disclosure, and which may whether in combination or otherwise form the basis of a future patent claim. The clauses may be combined in the manner explicitly stated. The subject matter of one or more clauses may be combined with the subject matter defined elsewhere, unless the combination would not be self-consistent or would otherwise not make sense.

CLAUSES

Clause 1. An aircraft wing comprising:
a main body having an outboard end,
a wing tip device extending from the outboard end of the main body of wing, the wing tip device comprising a main aerofoil, the main aerofoil having a first portion extending across at least 25% of the total length of the wing tip device, and a second portion outboard of the first portion, and extending across at least 25% of the total length of the wing tip device,
the first portion being shaped such that the angle of the local dihedral varies monotonically from a value of less than +20 degrees at an inboard location to a value of greater than +50 degrees in the outboard direction,
the second portion being shaped such that the angle of the local dihedral varies monotonically from a value of greater than +50 degrees at an inboard location to a value of less than +20 degrees in the outboard direction.

Clause 2. An aircraft wing according to clause 1, wherein the magnitude of the rate of change of the dihedral angle with increasing distance in the outboard direction is such that the maximum variation in angle over any portion of the main aerofoil extending along 10% of the length of the main aerofoil is less than 30 degrees.

Clause 3. An aircraft wing according to clause 1 or clause 2, wherein the first portion and the second portion are joined by an intermediate portion extending across at least 10% of the total length of the main aerofoil.

Clause 4. An aircraft wing according to clause 3, wherein the intermediate portion includes an essentially planar portion extending across at least 10% of the total length of the main aerofoil.

Clause 5. An aircraft wing according to clause 3 or clause 4, wherein the intermediate portion includes both an inboard region in which the local dihedral increases in the outboard direction and an outboard region in which the local dihedral decreases in the outboard direction.

Clause 6. An aircraft wing according to any of clauses 3 to 5, wherein the essentially planar portion extends across no more than 30% of the total length of the main aerofoil.

Clause 7. An aircraft wing according to any preceding clause, wherein the main aerofoil terminates at a substantially horizontal tip.

Clause 8. An aircraft wing according to any preceding clause, wherein the wing comprises a blended region blending between the first portion of the wing tip device and the outboard end of the main body of wing.

Clause 9. An aircraft wing according to any preceding clause, wherein the angle of the greatest local dihedral of the main aerofoil of the wing tip device is less than 75 degrees.

Clause 10. An aircraft wing according to any preceding clause, wherein the main aerofoil of the wing tip device is braced by means of a supporting structure extending from the first portion or a position inboard of the first portion to the second portion or a position outboard of the second portion.

Clause 11. An aircraft wing according to clause 10, wherein the supporting structure extends below the main aerofoil.

Clause 12. An aircraft wing according to clause 10 or clause 11, wherein the supporting structure is so shaped that its chordwise dimension at any position along at least 90% of its length is less than the chordwise dimension of the main aerofoil at the same position in the spanwise direction.

Clause 13. An aircraft wing according to any of clauses 10 to 12, wherein the supporting structure is so shaped that for at least 90% of its length the angle of the local dihedral varies monotonically from a value of greater less than +20 degrees at an inboard location to a value of greater than +70 degrees at an outboard location.

Clause 14. An aircraft wing according to any of clauses 10 to 13, wherein the magnitude of the rate of change of the dihedral angle of the supporting structure with increasing distance in the outboard direction is such that the maximum variation in angle over any portion of the supporting structure extending over 10% of its total length is less than 30 degrees.

Clause 15. An aircraft wing according to any of clauses 10 to 14, wherein the supporting structure extends in the outboard direction from a region on the underside of the main aerofoil which is substantially coplanar with the main body of the wing.

Clause 16. An aircraft wing according to any of clauses 10 to 15, wherein the trailing edge of the supporting structure does not extend rearwards of the trailing edge of the main aerofoil.

Clause 17. An aircraft wing according to any of clauses 10 to 16, wherein the main aerofoil entirely overlays the supporting structure when viewed along the centreline of the wing.

Clause 18. An aircraft wing according to any of clauses 10 to 17, wherein the supporting structure is a secondary aerofoil structure.

Clause 19. An aircraft wing according to any of clauses 10 to 18, wherein the supporting structure comprises an actuator arranged to alter the shape of the main aerofoil.

Clause 20. An aircraft wing according to any preceding clause, wherein the chordwise cross-section of the main aerofoil at an inboard end of the wing tip device is substantially identical to the chordwise cross-section of the outboard end of the fixed wing.

Clause 21. An aircraft wing according to any preceding clause, wherein the main aerofoil of the wing tip device has a shape when viewed in a line-of-flight direction that resembles the letter "S" with a horizontal skew which increases the distance between the start and end of the letter.

Clause 22. An aircraft wing according to any preceding clause, wherein the main aerofoil of the wing tip device has a substantially sigmoidal shape when viewed in a line-of-flight direction.

Clause 23. A wing tip device of the aircraft wing according to any preceding clause.

Clause 24. A wing tip device of or for a wing of an aircraft, wherein the wing tip device comprises a main aerofoil structure, which follows a sigmoidal profile when viewed in a line-of-flight direction.

Clause 25. The wing tip device according to clause 24, wherein the height of the main aerofoil structure continuously increases in the outboard direction.

Clause 26. The wing tip device according to clause 24 or clause 25, wherein the angle of the local dihedral of the main aerofoil structure does not exceed +75 degrees.

Clause 27. The wing tip device according to any of clauses 24 to 26, wherein the wing tip device comprises a structural support, which extends between an inboard end on the underside of the wing tip device and an outboard end of the main aerofoil on the underside of the wing tip device.

Clause 28. The wing tip device according to clause 27, wherein the structural support occupies a volume of space which is less than half the volume of space occupied by the main aerofoil.

Clause 29. An aircraft comprising the aircraft wing of any of clauses 1 to 22 or the wing tip device of any of clauses 23 to 28.

Clause 30. A method of operating an aircraft, the aircraft comprising wings which each include a wing tip device having an sigmoid shaped upper aerofoil extending from a root to a tip, the root of the wing tip device being located at, and blending in with, the outboard end of a main wing structure, the method including
using the upper aerofoil to reduce the drag that would otherwise be induced by wingtip vortices, and
providing support to the upper aerofoil with an aerodynamically shaped support member which extends, beneath the upper aerofoil, from an inboard location at or proximate to the root of the wing tip device to an outboard location at or proximate to the tip of the wing tip device.

Clause 31. A method according to clause 30, including using the support member to change the shape of the upper aerofoil.

Clause 32. A method according to clause 31, wherein the step of using the support member to change the shape of the upper aerofoil includes deforming the shape of each wing tip device from a first geometrical configuration in which the wing tip devices are set up in a manner to suit a first flight to a second geometrical configuration in which the wing tip devices are set up in a manner to suit a second flight, different from the first flight, such that the fuel efficiency of the aircraft if set up in the second configuration would be worse for the first flight than when set up in the first configuration, and
the fuel efficiency of the aircraft if set up in the first configuration would be worse for the second flight than when set up in the second configuration.

Clause 33. A method according to clause 31 or clause 32, wherein the step of using the support member to change the shape of the upper aerofoil includes changing the shape or length of the support member with an actuator housed at least partly within the support member.

Clause 34. A method according to any of clauses 30 to 33, wherein during flight the support member and the upper aerofoil together form a closed surface wing tip device.

Clause 35. A method according to any of clauses 30 to 34, using an aircraft according to clause 29.

It will of course be appreciated that features described in relation to one aspect of the present invention may be incorporated into other aspects of the present invention. For example, the method of the invention may incorporate any of the features described with reference to the apparatus of the invention and vice versa.

Also, by way of a further example, optional (preferred or otherwise) features described in relation to at least one of the lower section, the upper section, the upper aerofoil, the main aerofoil, the main aerofoil structure, the supporting structure, the support member, the structural support, the primary aerofoil structure, the secondary aerofoil structure, the closed surface wing tip device, and other integers of the embodiments and/or inventions described herein, may be incorporated as features of other such integers, unless clearly contradictory or inappropriate.

DESCRIPTION OF THE DRAWINGS

Embodiments of the present invention will now be described by way of example only with reference to the accompanying schematic drawings of which.

DETAILED DESCRIPTION

Figure 1:
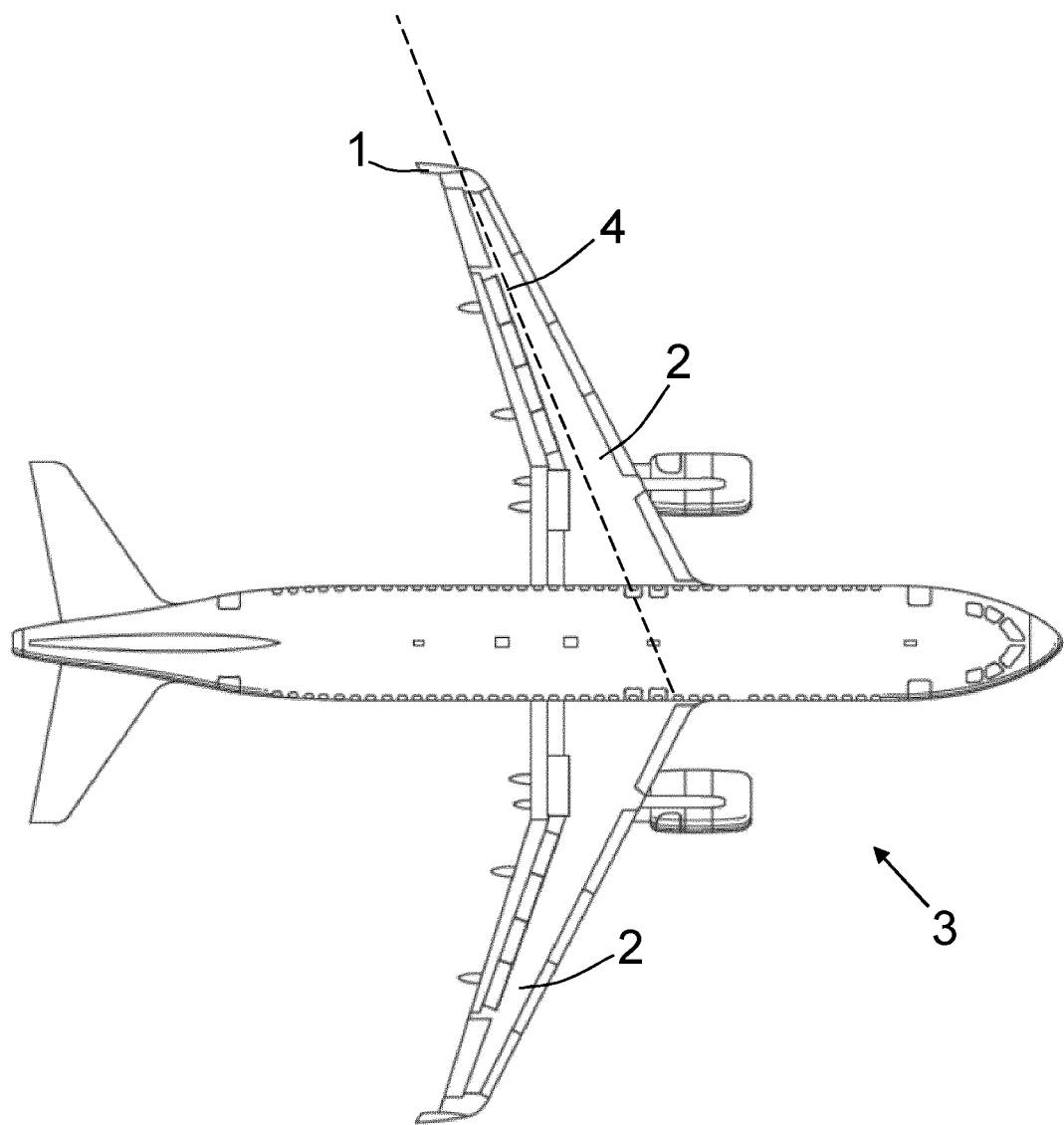
FIG. 1 shows an aircraft of a type suitable for use with a wing tip device according to a first embodiment of the invention.

FIG. 1 shows the location of a wing tip device 1 on a wing 2 of an aircraft 3, namely at the outboard end of its wing. The aircraft has two such wings 2. Each wing has a centreline 4 (median chordline), which is used in the context of this description to define the "sweep angle" of the wing, which in this case is about 25 degrees. The wing tip device may be in accordance with any of the embodiments of invention descried below, or variations thereof.

Figure 2:
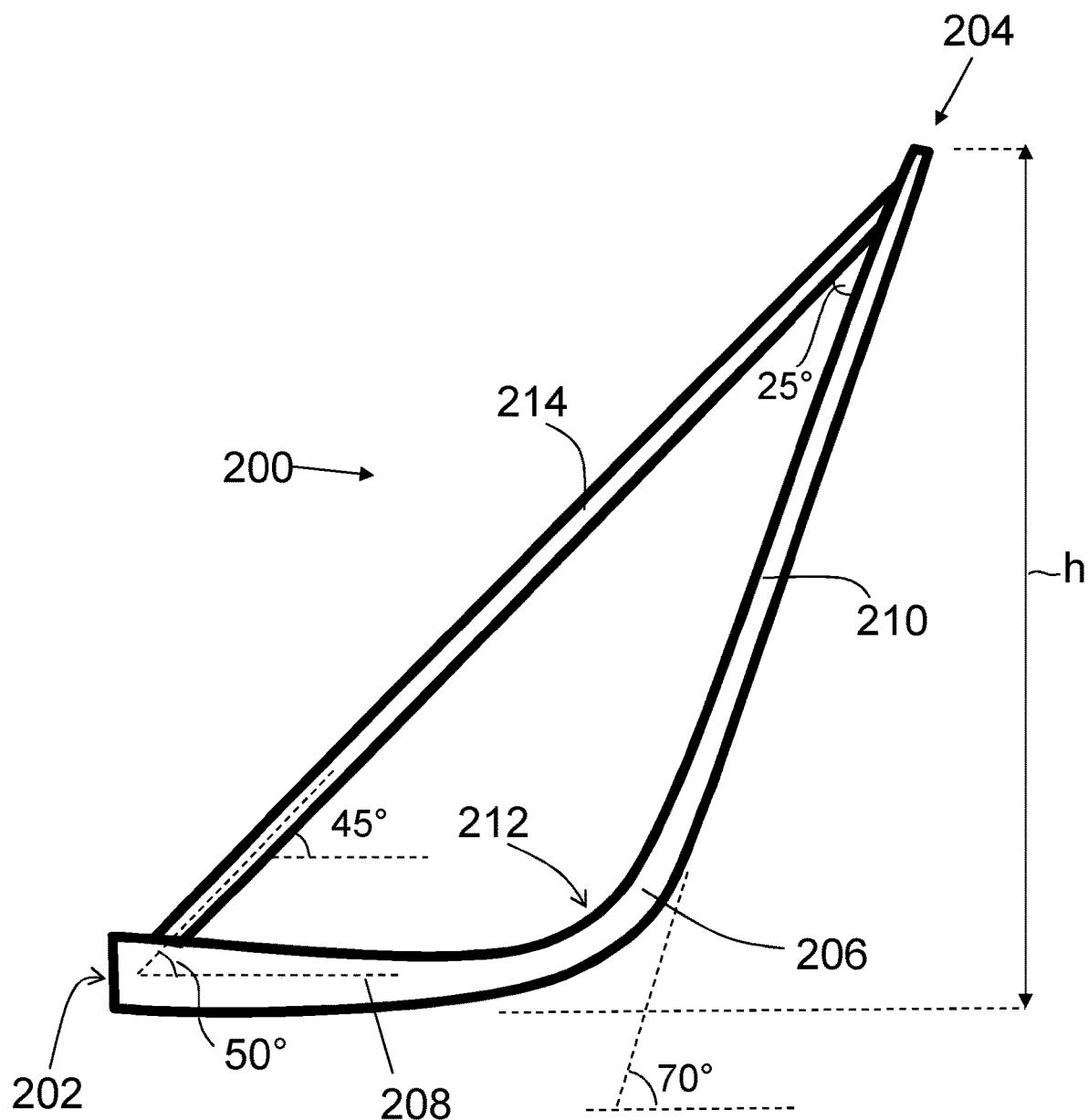
FIG. 2 shows a side view of a wing tip according to the first embodiment.

FIG. 2 shows a wing tip device 200, of a first embodiment, viewed in the longitudinal axis of the aircraft. The device 200 has a root 202 at its inboard end and a tip 204 at its outboard end. The device 200 comprises a lower section 206 which has the general profile of a blended winglet. The lower section 206 in this case has a shape corresponding generally to that of a "sharklet" for the Airbus A320 Neo. Thus the section 206 comprises a generally horizontal inbound portion 208 that is joined to a canted outbound portion 210, via a blended region 212. The dihedral angle of the canted outdone portion is about 70° for at least 1,000 mm of its extent. The height, h, of the tip 204 above the horizontal position of the inbound portion 208 is at least 2,000 mm. Each lower section 206 has a mass of the order of at least 80 kg.

The device 200 comprises an upper section 214 which acts as a strut extending from a location at or directly adjacent to the root 202 of the device to a location at or directly adjacent to the tip 204 of the device 200. The upper section 214 and the lower section 206 thus define, at least in part, a closed surface. In this embodiment, the upper section 214 is generally planar and is shown in FIG. 2 as having a dihedral angle of about 45° for substantially the entirety of its extent in the spanwise direction. Each upper section 214 has a mass of the order of 25 kg (optionally, in the range of 20 kg to 30 kg).

It will be noted that the upper section 214 extends from an outboard position set slightly inward from the extreme end of the tip 204 of the device 200 to an inboard position set slightly outward from the root 202 of the device 200. There is thus a slight overhang at the tip 204 of the device 200 which does not form a part of the closed surface.

The device shown in FIG. 2 thus comprises a blended winglet device 206 (in the form of a sharklet) which is strengthened by means of an upper section 214, which also presents an aerofoil surface. It is believed that substantially the same, or better, aerodynamic benefits may be provided by the lower section 206 as a conventional sharklet structure but as a result of the strengthening provided by the upper section the lower section can be constructed so as to have a lower mass than the conventional sharklet structure, by possibly greater than 25 kg of mass saving per wing tip device. The wing tip device of the first embodiment may therefore be substantially mass neutral as compared to the same aircraft when fitted with a sharklet wingtip device. The angle formed between the lines of the upper section 214 and the lower section 206 in the region of the root 202 is about 50°. The angle formed between the lines of the upper section 214 and the lower section 206 in the region of the tip 204 is about 25°. The region at which the upper section 214 joins the lower section 206 in the region of the root 202 coincides with a rib (not shown separately in FIG. 2). There may be at least one further rib outboard of the rib to which the upper portion 214 so attaches.

Figure 3:
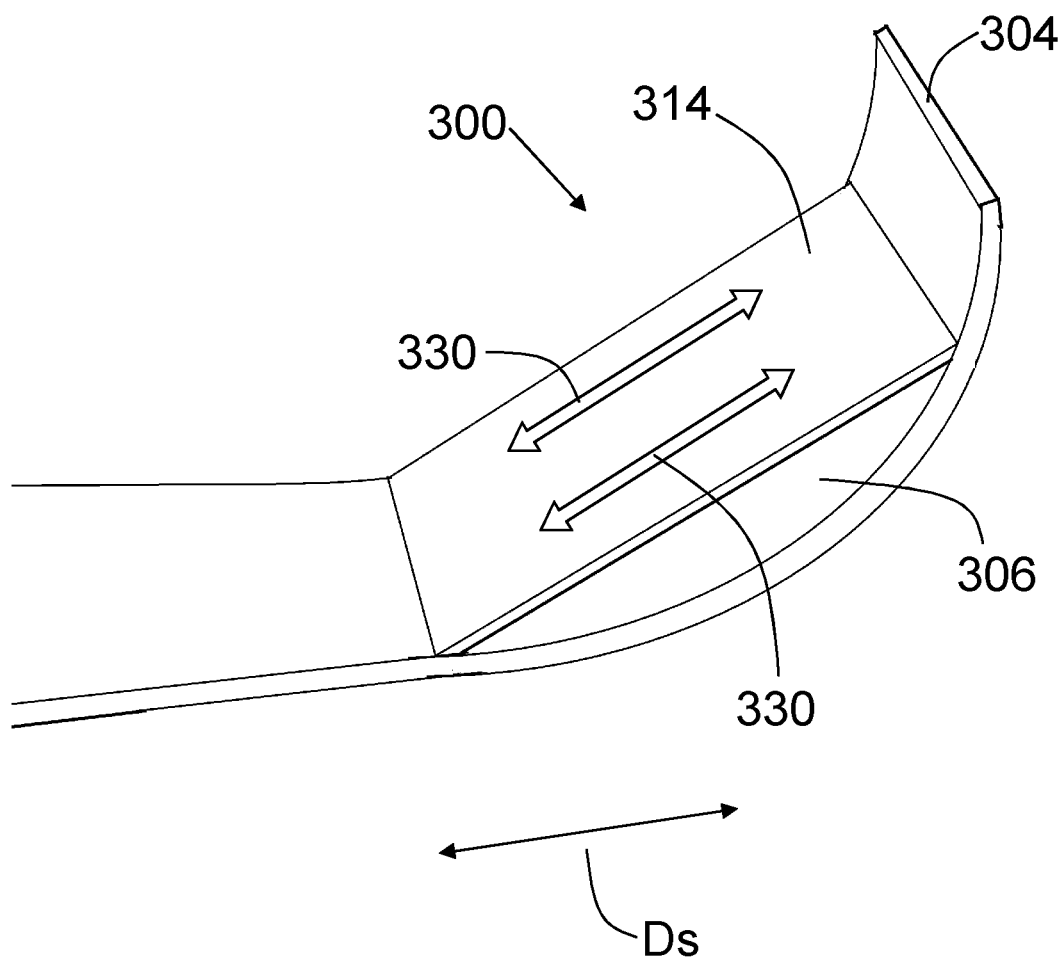
FIG. 3 shows a perspective view of a wing tip device similar to that shown in FIG. 2, but in accordance with a second embodiment.

FIG. 3 shows (with a highly schematic diagram) a perspective view of a device 300 according to a second embodiment, which has substantially the same shape and configuration as the device of FIG. 2. The reference numerals as used in FIG. 3 will refer to the same parts as the reference numerals used in FIG. 2, but will start with a "3" instead of starting with a "2". The upper section 314 of the device 300 includes two elements 330, which are arranged to exert varying forces within the structure of the upper section 314 in a direction substantially parallel with the spanwise direction $D_s$ of the wing, when viewed in plan. (It will be understood that in the present context the spanwise direction at a given location is taken as the mean direction of the leading and trailing edges of the wing when viewed in plan, and not necessarily perpendicular to the longitudinal direction of the aircraft). In this embodiment, the elements 330 may be in the form of hydraulic actuators. By means of varying the force exerted by each element 330 in the upper section 314, it is possible to change the global shape of the upper section 314 and consequently also change the global shape of the lower, winglet, section 306. In use, it is then possible to morph the aerodynamic shape of the lower, winglet, section 306 to suit a particular flight plan. For example for a ½ hour flight, the optimum shape of the winglet part of the wing may be different from the optimum shape of the winglet part for a three hour flight. The elements 330 are independently operable and therefore are able to manipulate the shape of the upper and lower sections 306, 314 with two degrees of freedom. If both elements 330 are contracted, the tip 304 of the device is moved inboard. If one element 330 is extended and the other element 330 is contracted then a twisting stress is induced in the upper and lower sections 306, 314. The hydraulic elements 330 can be controlled from within the aircraft, for example by the pilot of the aircraft, during flight, but it is envisaged that the hydraulic elements 330 would typically be set up in advance of take-off and not adjusted again until landing. However, in more sophisticated embodiments of the present invention, the hydraulic elements 330 could be controlled during flight so as to improve the aerodynamic performance of the wing as between, for example, take-off and cruise conditions.

Figure 4:
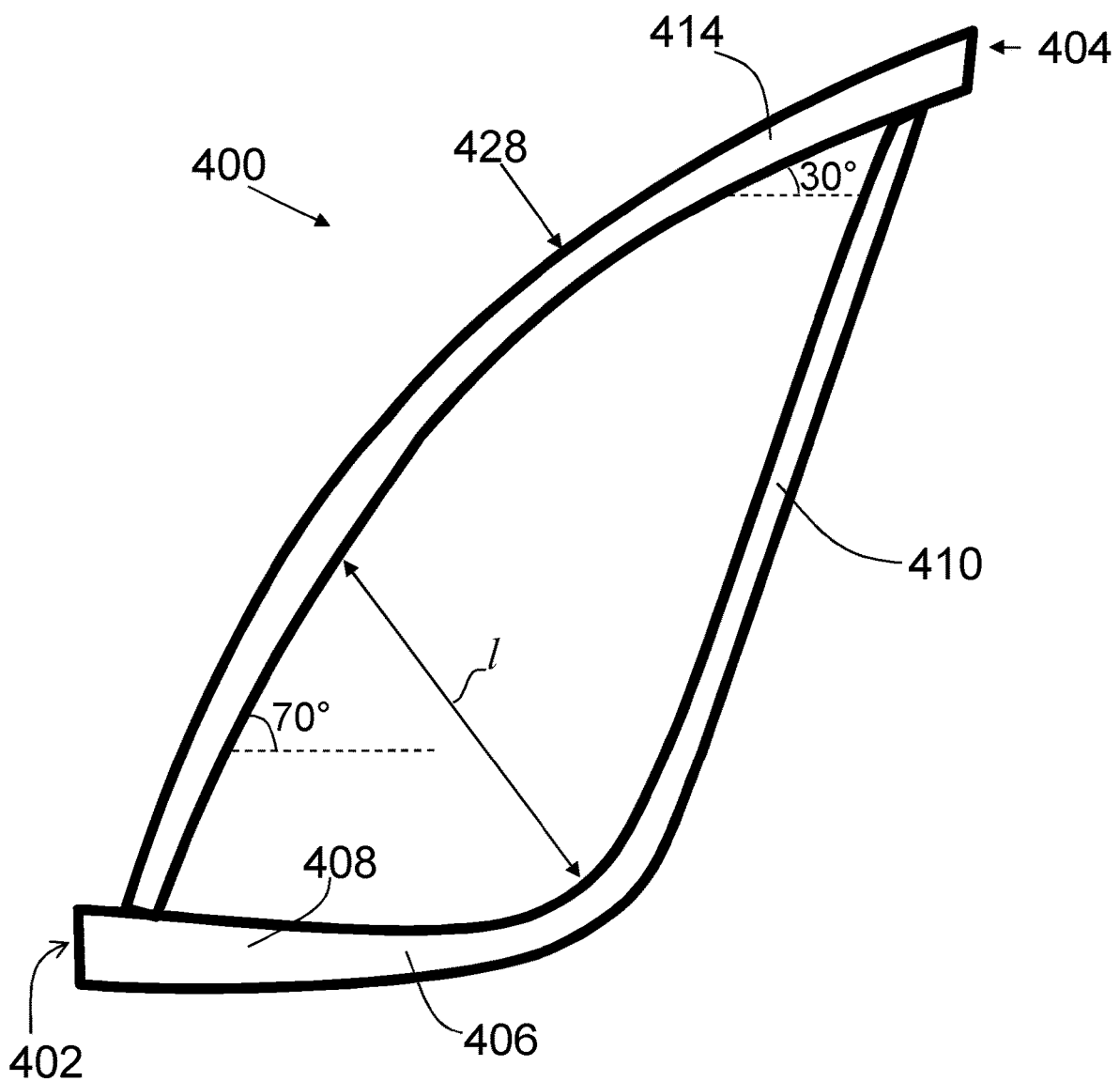
FIG. 4 shows a side view of a wing tip according to a third embodiment.

FIG. 4 shows a wing tip device 400, of a third embodiment, viewed in the longitudinal axis of the aircraft. The reference numerals as used in FIG. 4 will refer to the same parts as the reference numerals used in FIG. 2, but will start with a "4" instead of starting with a "2". The device 400 has a root 402 at its inboard end and a tip 404 at its outboard end. The device 400 comprises a lower section 406 which has the general profile of a blended winglet. The lower section 406 has a shape which is substantially the same as the lower section 206 of the first embodiment of the invention. Thus the section 406 comprises a generally horizontal inbound portion 408 that is joined to a canted, essentially planar, outbound portion 410, via a blended transition region.

The device 400 comprises an upper section 414 extending from a location at or directly adjacent to the root 402 of the device to a location in the region of the tip 404 of the device 400. It will be noted that the upper section 414 extends from an outboard position set slightly inward from the extreme end of the tip 404 of the device 400. In this embodiment, the tip of the upper section 414 extends to an outboard position beyond the tip of the lower section 410.

In this embodiment, the upper section 414 is generally curved, such that its upper surface 428 is substantially convex. The upper section 414 thus has a dihedral angle that varies along the spun way is extent of the upper section from a value of about 70° to a value of about 30°. It will be seen that the gap between the upper and lower sections of the wingtip can be several orders of magnitude bigger than the thickness of either the upper or lower section. For example, the length represented by the arrow labelled l (such a length representing the shortest distance between the lower surface of the upper section 414 to the upper surface of the lower section 406 at the location of the arrow l) is greater than 500 mm.

Figure 5:
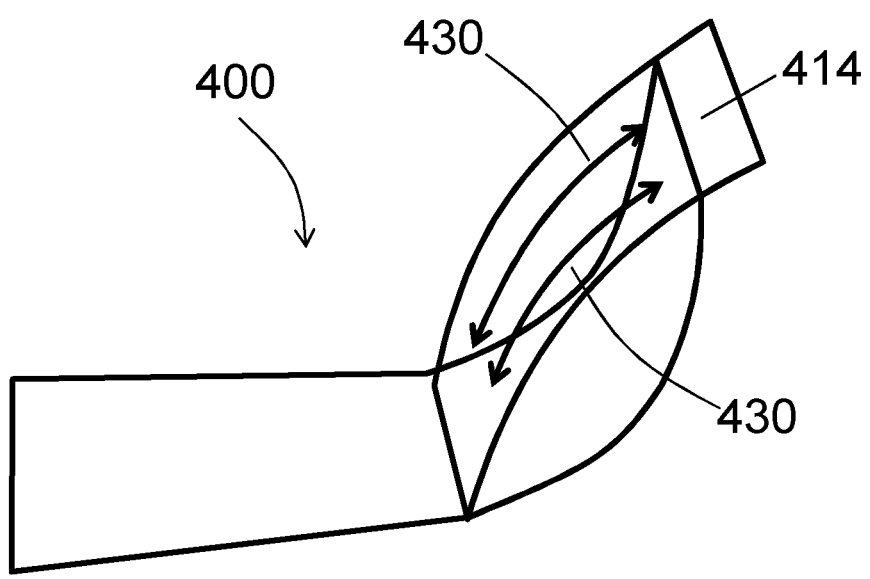
FIG. 5 shows a perspective view of the wing tip device shown in FIG. 4 set up in a first configuration.

FIG. 5 shows the wingtip device 400 of the third embodiment in a highly schematic manner. The upper section 414 comprises two integrally formed cable systems 430 which are arranged within the structure of the upper section 414 in such a way as to enable the shape of the upper section 414 to be deformed elastically under the control of the cable systems 430. In this embodiment, the integrated cable systems 430 are designed to be adjusted by ground crew when attending to the aircraft when on the ground and a stationary. Once the geometry of the wingtip device 400 has been set up by ground crew by means of making adjustments to the integrated cable systems 430 and the aircraft is moving, the setup of the wingtip device, in so far as its global geometry is concerned, is a fixed and cannot be altered or controlled by the pilot during flight. FIG. 5 shows the wingtip device 400 in a first configuration, in which the tension in each cable system is approximately equal, at about 250 N.

Figure 6:
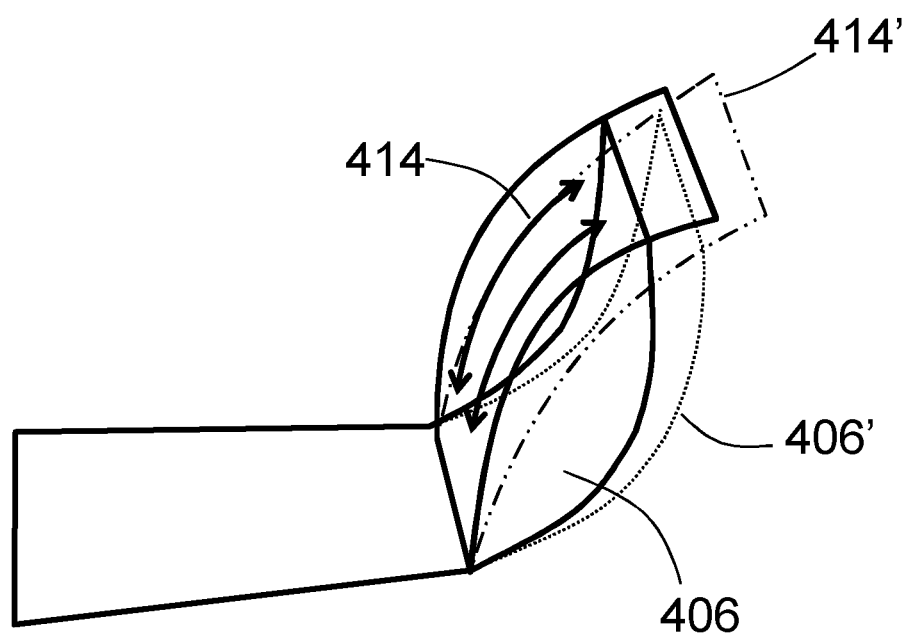
FIG. 6 shows a perspective view of the wing tip device shown in FIG. 4 set up in a second configuration.
Figure 7:
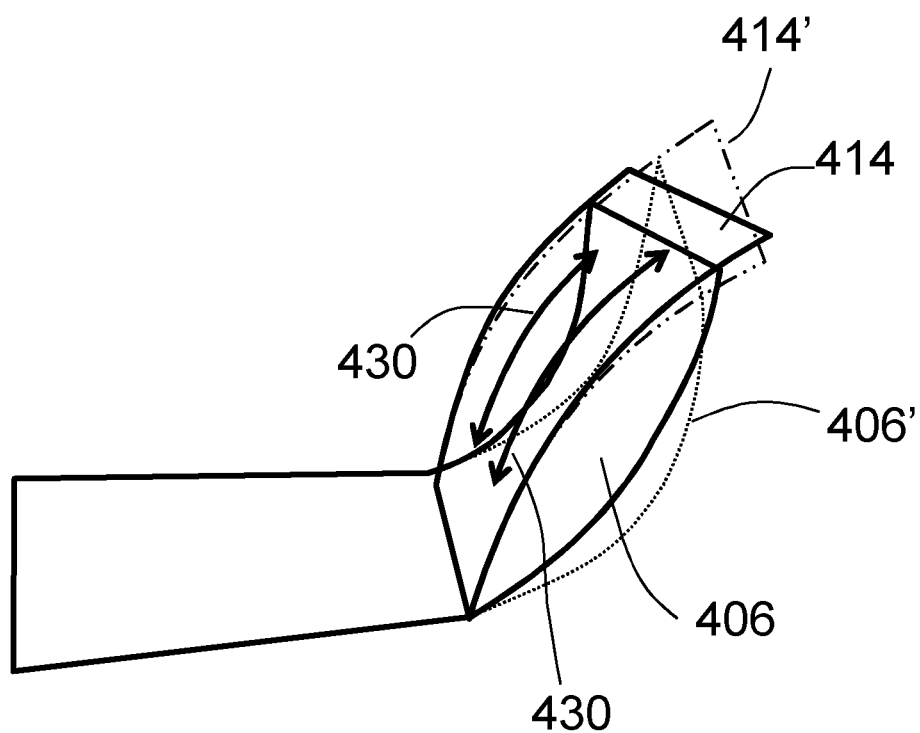
FIG. 7 shows a perspective view of the wing tip device shown in FIG. 4 set up in a third configuration.

FIGS. 6 and 7 show the wingtip device 400 in a second configuration and a third configuration, respectively. In both FIGS. 6 and 7, the position of the upper section 414 when in its first configuration is shown in broken line (labelled as 414') the position of the lower section 406 when in its first configuration is shown in dotted line (labelled as 406'). FIG. 6 shows the cable systems both under increased tension for example each exerting a tension of about 500 N, resulting in the tip of the upper section 414 being drawn more inboard with a consequent movement of the tip of the lower section 406 inboard also.

FIG. 7 illustrates a case where one of the cable systems 430 has a tension (for example 100 N) significantly lower than the tension in the other of the cable systems 430 (for example 700 N). In this case the upper section 414 and the lower section 406 are twisted from the position of the first configuration. There are portions on the wingtip device which moved by more than 50 mm as between the first configuration and the second configuration. Similarly, there are portions on the wingtip device which move by more than 50 mm as between the first configuration and the third configuration. The movement from the first to the second configurations (and the movement from the first to the third configurations), is such that the wingtip device is deformed elastically and is thus able to return to its previous shape, as and when the internal stresses are returned to their previous values. It will be seen that the extent of the cable systems 430 in the upper section 414 follows a path that curves, and that the curvature of that path can change as between the various configurations of the wingtip device. Such a curvature, and changes in curvature, can be accommodated by means of the cable passing via channels, pulleys, wheels or the like.

The embodiments described with reference to FIGS. 2 to 7 may be considered as having a primary aerofoil surface (for example in the form of a wing tip device, winglet or sharklet) and a secondary surface (for example a strut, or bracing structure) that is arranged to deform the shape of the wing tip device and/or which braces/supports the primary aerofoil surface. The primary surface and the secondary surface may cooperate to form a closed loop at the wing tip. In FIGS. 2 to 7 the secondary surface is located above the primary aerofoil surface. In other embodiments, as illustrated in some of the other Figures for example, the secondary surface may be located at least partially below the primary aerofoil surface.

Figure 8:
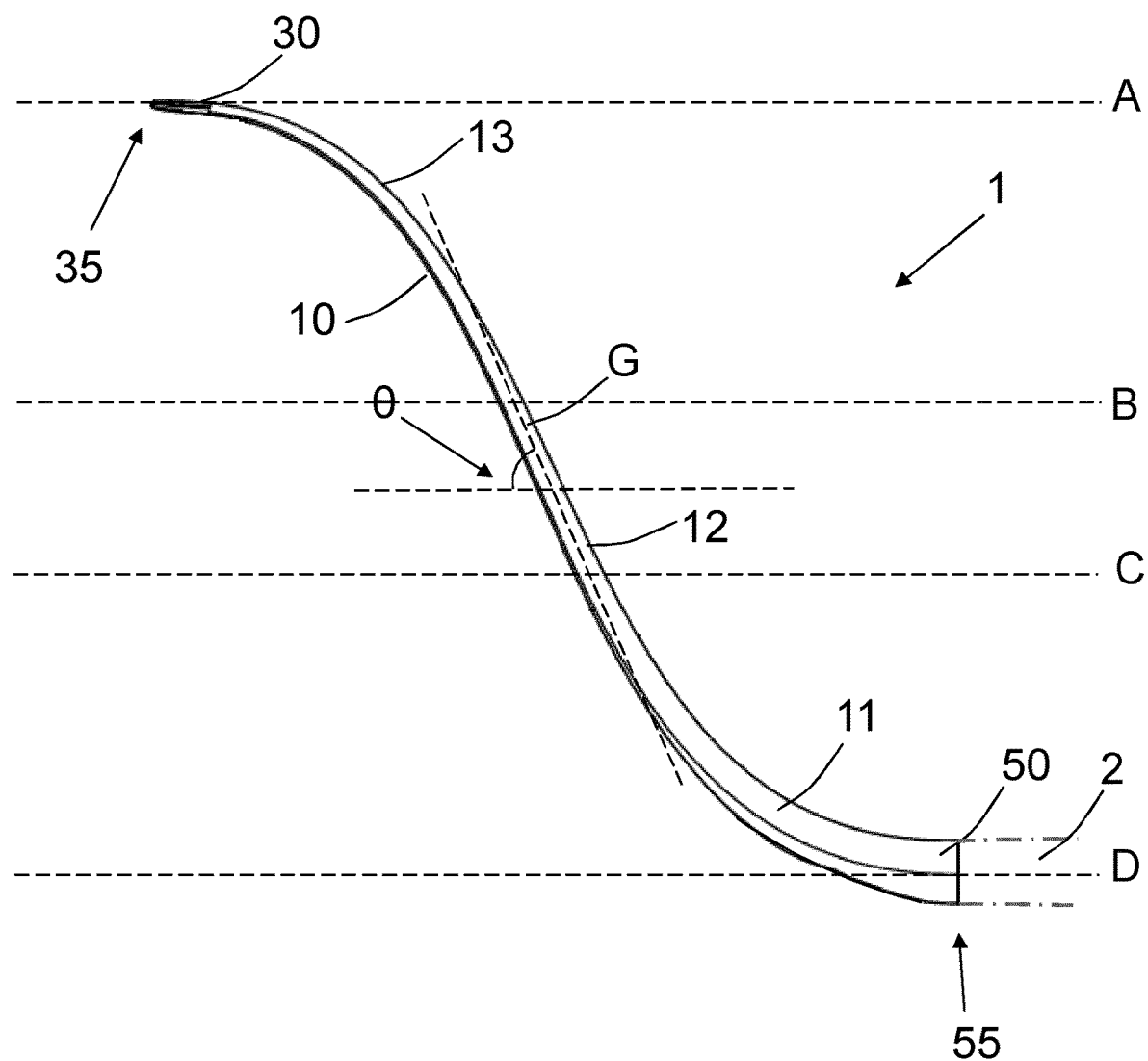
FIG. 8 shows a frontal view of a wing tip device according to a fourth embodiment of the invention.

According to a fourth embodiment of the invention shown in FIG. 8, the wing tip device 1 has a main aerofoil 10 including a tip 30 and a root portion 50. The tip 30 is at an outboard end 35 of the wing tip device 1 and the root portion 50 is at an inboard end 55 of the wing tip device 1.

When viewed from the front (the view shown in FIG. 8—i.e. in the line of flight direction) or rear, the main aerofoil 10 follows a sigmoidal curve. The height of the main aerofoil 10 does not decrease in the outboard direction. The height of the main aerofoil increases monotonically in the outboard direction. The main aerofoil is self-support and has a mass of the order of about 110 kg.

The main aerofoil 10 extends from the root portion 50 to the wing tip 30. The main aerofoil 10 has a first curved portion 11 extending from the root of the wing tip device, and a second curved portion 13, curving in the opposite direction and extending to the tip of the wing tip device. The first curved portion 11 and the second curved portion 13 are separated by a generally planar (within +/−2 degrees) transition portion 12. FIG. 8 shows four horizontal lines A, B, C, and D, which notionally define the regions of the different portions of the wing tip device. The height of the tip of the main aerofoil above the horizontal position of the root of the main aerofoil is at least 2,000 mm (the height being about the same as the distances between lines A and D). A maximum gradient line G is also shown. Along the length of the upper surface of the aerofoil 10, the first curved portion 11 (between lines C and D) represents about 40% of the length of the aerofoil. The generally planar transition portion 12 (between lines B and C) represents about 20% of the length of the aerofoil 10. The second curved portion 13 (between lines A and B) represents about 40% of the length of the aerofoil. In the first curved portion 11, the gradient of the main aerofoil 10 increases in the outboard direction relative to the horizontal (lateral) axis. It will be seen that the first portion is shaped such that the angle of the local dihedral varies monotonically from a value of about 0 degrees at the root (intersection with line D) to a value of about +70 degrees at a location further outboard (intersection with line C). The generally planar transition portion 12 (between lines B and C) has a local dihedral that is substantially constant and about +70 degrees. It will be seen that the second curved portion 13 is shaped such that the angle of the local dihedral varies monotonically from a value of about +70 degrees at its most inboard part (intersection with line B) to a value of about +2 degrees at the tip (intersection with line A). The gradient of the main aerofoil 10 at the tip 30 is thus substantially the same as the gradient of the main aerofoil at the root portion 50.

The maximum gradient (line G) is the maximum gradient of the transition portion 12 (between lines B and C)—the local dihedral at the maximum gradient is labelled as θ (theta) in the Figures. At −70 degrees, θ is less than the local dihedral at the maximum gradient portion of a sharklet style winglet which may have a local dihedral of 75 degrees or higher (i.e. even closer to the vertical). A lower θ (e.g. less than 75 degrees) may nevertheless provide a benefit, that compares well to that provided by a sharklet, in managing the airflow over the upper surface of the main aerofoil and thus reducing induced drag that might others be caused by vortices of the tip of the wing.

The angle of the local dihedral defined by the sigmoid-like shape of the aerofoil 10 varies gradually, thus having no sharp edges that might otherwise cause problems aerodynamically and/or structurally. The dihedral angle varies by 70 degrees over about 40% of the length of the main aerofoil (i.e. an average of almost 20 degrees for every 10% of length), but sufficiently gently that, for any section being 10% of the length of the main aerofoil, the change in the dihedral angle is less than 30 degrees.

It will be appreciated that there may be a smooth transition, even where there are changes in sweep or twist at the junction between the fixed wing 2 (shown in part only in dashed line in FIG. 8) and the wing tip device 1. In this embodiment, there are no discontinuities at the junction between the fixed wing and wing tip device. The upper and the lower surfaces of the wing tip device are continuations of the upper and lower surfaces of the fixed wing. The span ratio of the fixed wing relative to the wing tip device may be such that the fixed wing comprises 70%, 80%, 90%, or more, of the overall span of the aircraft wing.

The first curved portion 11 of the wing tip device 1 is immediately outboard of the root portion 50. There is no significant planar portion between the root portion 50 and the first curved portion 11. This allows for a large proportion of the mass of the wing tip device 1 to be located close to the root portion 50 of the wing tip device 1. The second curved portion 13 of the wing tip device 1 is immediately inboard of the tip 30.

Figure 9:
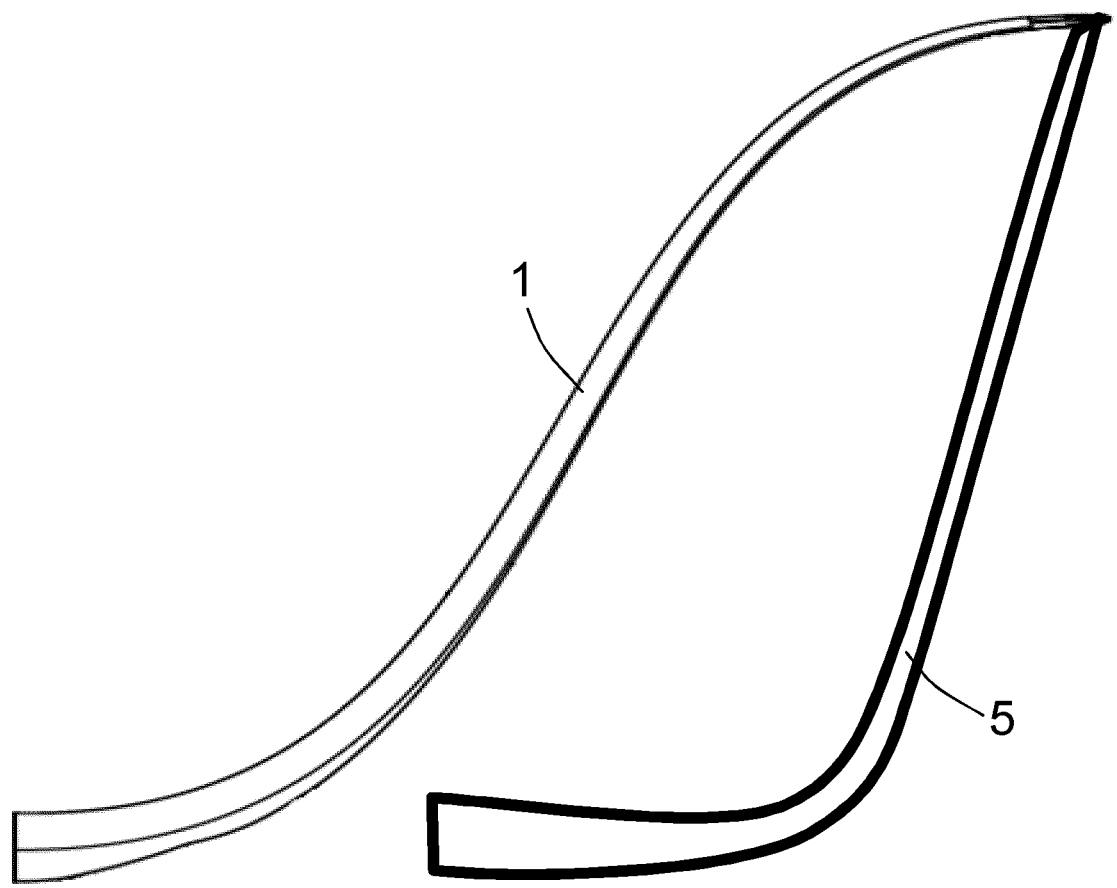
FIG. 9 shows a frontal view of the wing tip device according to a fourth embodiment of the invention and a "sharklet" wing tip device.
Figure 10:
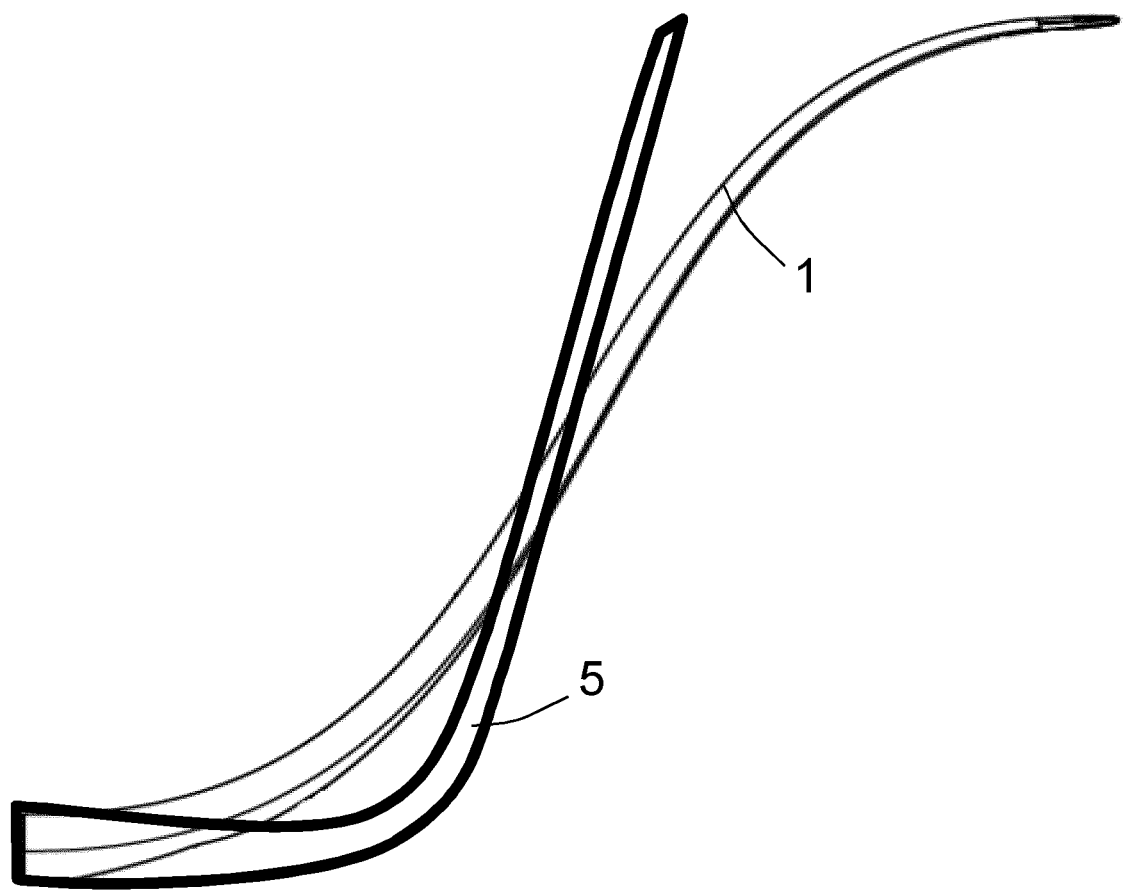
FIG. 10 shows a frontal view of the wing tip device according to a fourth embodiment of the invention and a "sharklet" wing tip device.

FIGS. 9 and 10 show the wing tip device 1 of the embodiment alongside a "sharklet" wing tip device 5 for the same aircraft wing (and being shown at the same scale). The wing tip device 1 has substantially the same height as a sharklet wing tip device 5. The aerodynamic benefits of the wing tip device 1 resulting from the height difference between the end of the wing tip and the wing is therefore similar in comparison to a sharklet 5. It can be seen from FIG. 9 that the wing tip device 1 is longer in the outboard direction in comparison to the sharklet 5, and therefore mounts onto a rib inboard of the rib to which a sharklet would typically be mounted. The shape of the wing tip device 1 is such that its centre of mass is further inboard in comparison to a sharklet.

FIG. 10 shows more clearly that the wing tip device 1 has a maximum dihedral less than that of the sharklet 5.

Figure 11:
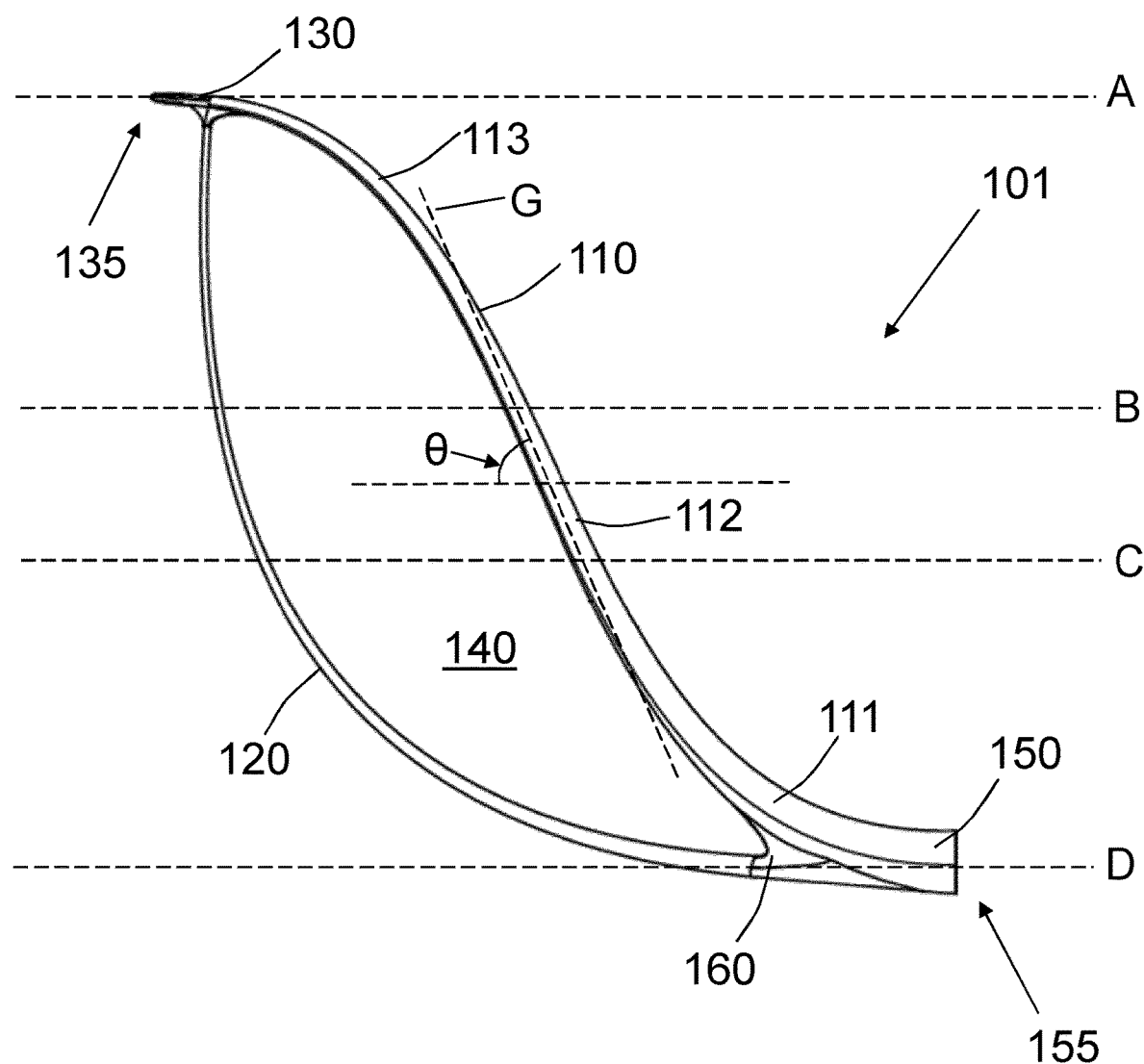
FIG. 11 shows a frontal view of a wing tip device according to a fifth embodiment of the invention.
Figure 12:
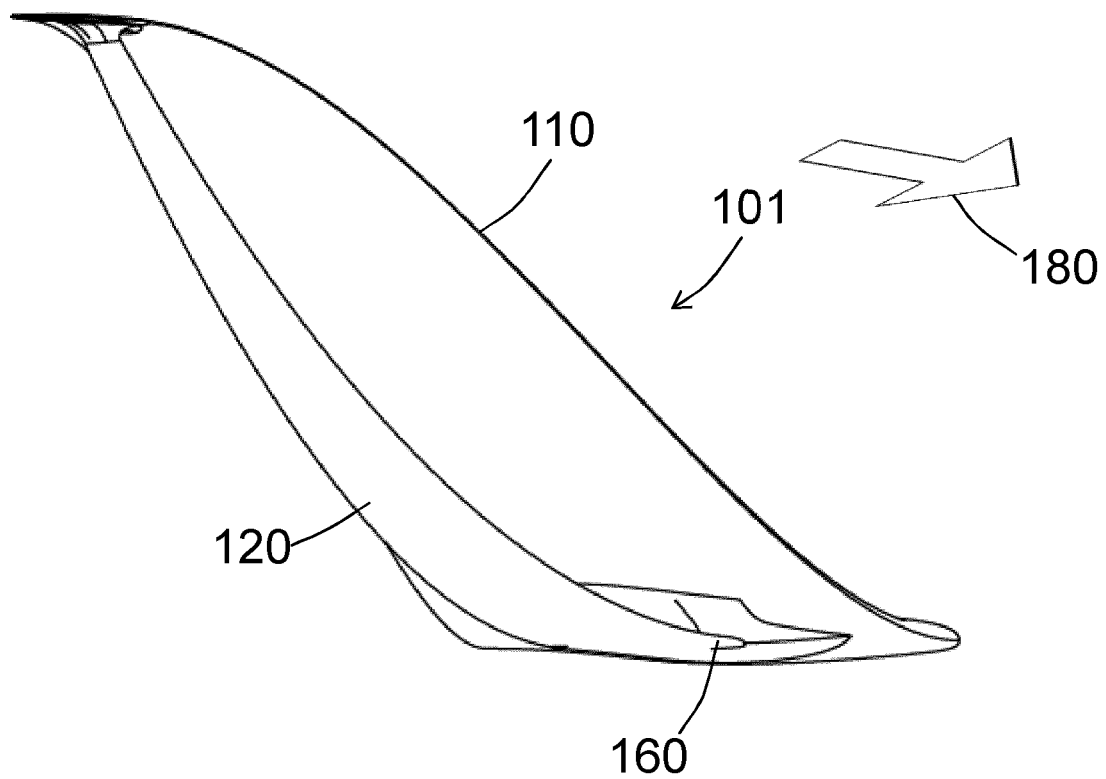
FIG. 12 shows a perspective view of the wing tip device from the outboard side according to the fifth embodiment of the invention.
Figure 13:
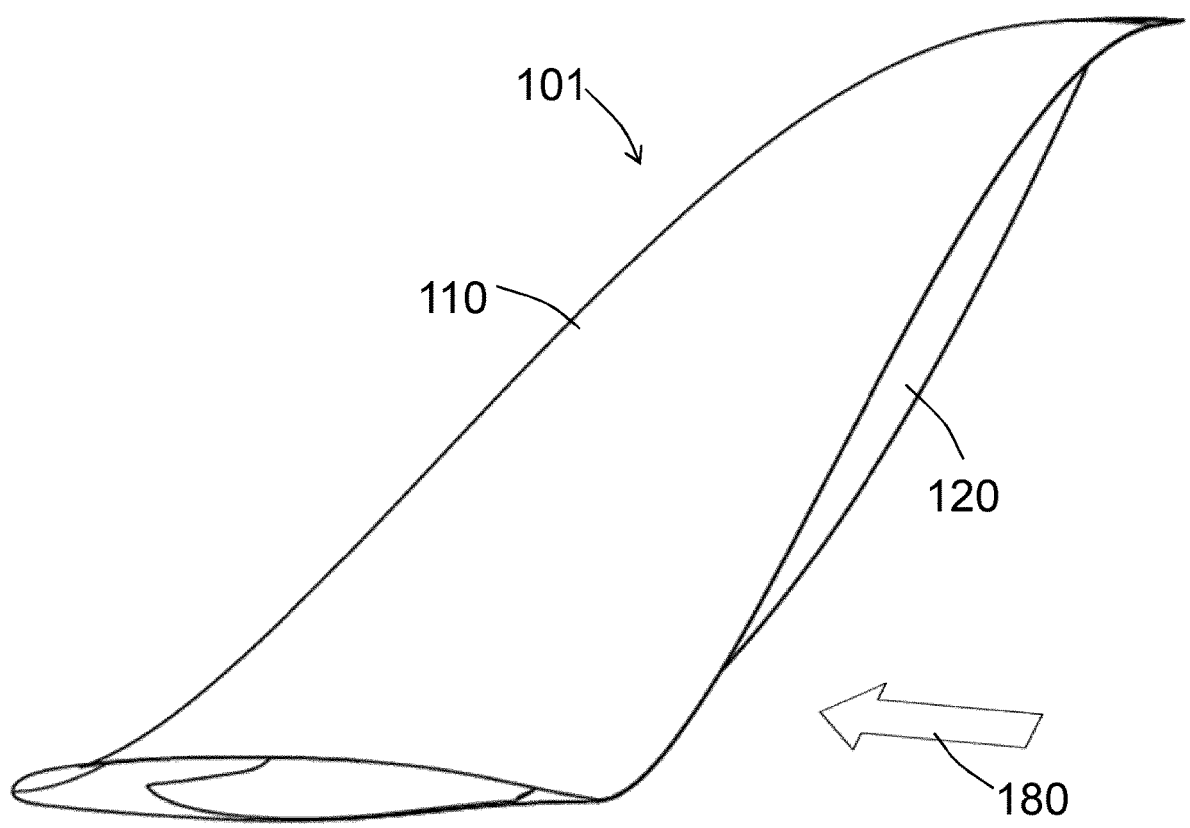
FIG. 13 shows a perspective view of the wing tip device from the inboard side according to the fifth embodiment of the invention.
Figure 14:
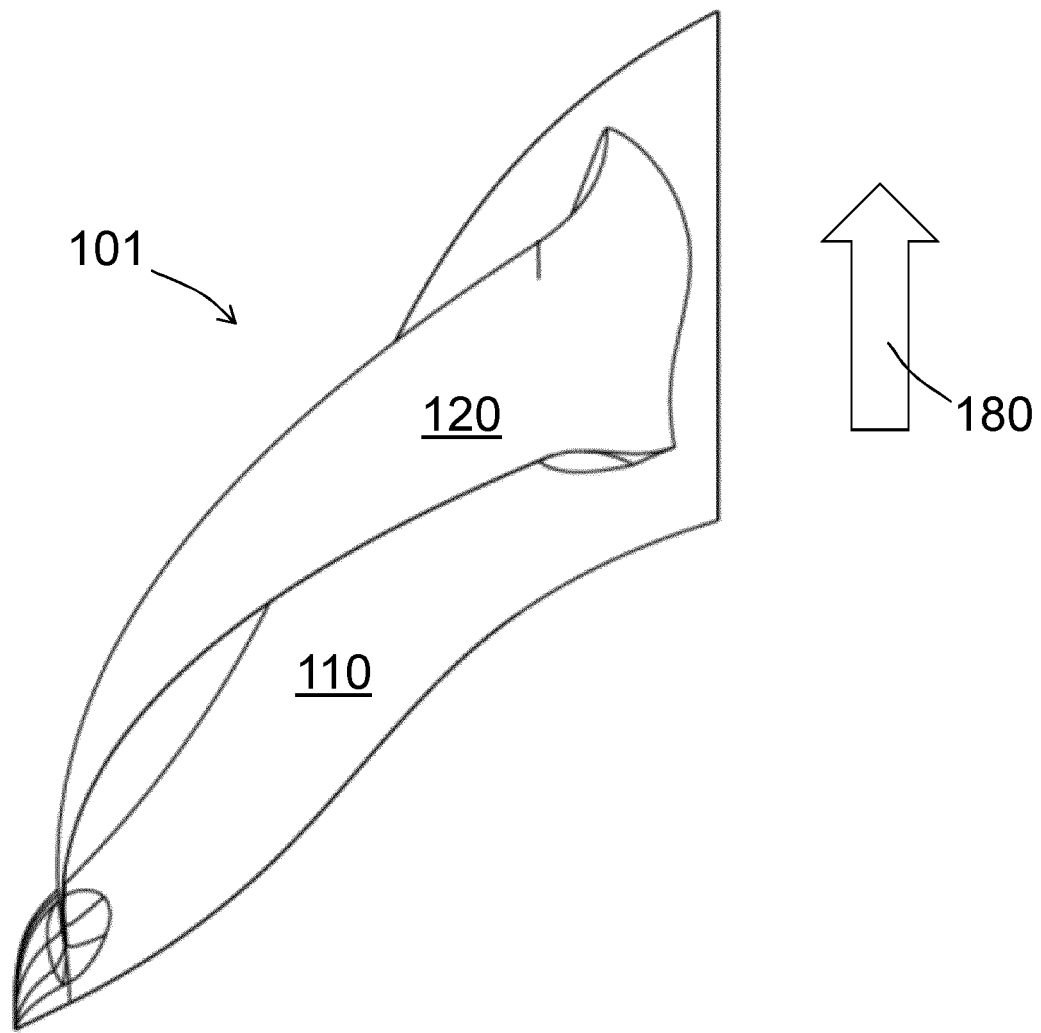
FIG. 14 shows a perspective view of the wing tip device from below according to the fifth embodiment of the invention.
Figure 15:
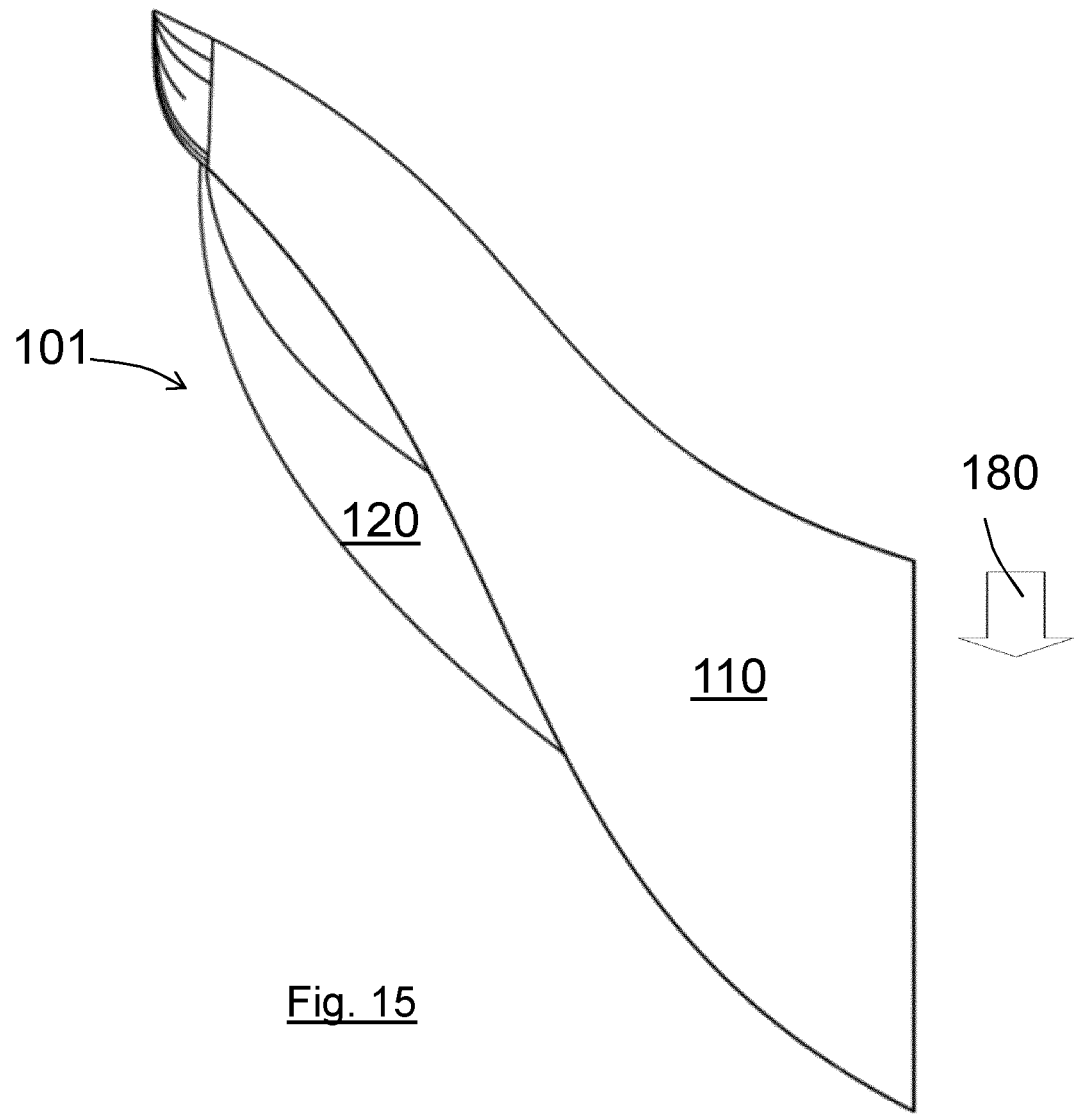
FIG. 15 shows a perspective view looking down and aftwards of the wing tip device according to the fifth embodiment of the invention.

A fifth embodiment of the invention is shown in FIG. 11. A wing tip device 101 has a main aerofoil 110, a support structure in the form of a support brace/member 120, a join 160, a tip 130 and a root portion 150. The main aerofoil 110 has the same general sigmoidal shape as the main aerofoil 10 of FIG. 8, so will only be described briefly here. (Similar reference numbers are used for similar parts, the reference numbers for the fifth embodiment being in the form "1NN", where NN is the reference number of the corresponding integer of the fourth embodiment). The main aerofoil 110 extends from the root portion 150 to the wing tip 130 and has a first curved portion 111 (between lines C and D), a transition portion 112 (between lines B and C) and a second curved portion 113 (between lines A and B).

The support structure 120 and the main aerofoil 110 form a closed loop and define an airflow channel 140. The wing tip device 100 is thus in the form of a closed loop wing tip device. The tip 130 is at an outboard end 135 of the wing tip device 100 and the root portion 150 is at an inboard end 155 of the wing tip device 100.

When viewed from the front (the view shown in FIG. 11) or rear, the main aerofoil 110 follows a sigmoidal curve, and has a shape and size similar to that of the fourth embodiment (albeit with slightly less structure—afforded by the structural support provided by the support member 120). The height of the main aerofoil 110 continuously increases in the outboard direction.

The supporting structure 120 is joined to the underside of the main aerofoil 110. The supporting structure 120 extends from the inboard end 155 of the main aerofoil 110 to the outboard end 135 of the main aerofoil 110. Although the term "joined" has been used to describe the attachment of the support structure to the main aerofoil, it may be that the supporting structure 110 is integrally formed with the main aerofoil 120. The supporting structure 120 is joined at the outboard end to the underside of the main aerofoil 110 substantially normal to the main aerofoil 110, thus providing good support from underneath, with a join that need not be long in the spanwise direction. Reducing the proportion of the weight of the wing tip which is outboard advantageously reduces the overall bending moment of the wing. Reducing the bending moment of the wing tip has a consequential benefit in reducing the strength needed for attaching the wing tip device to the fixed wing.

The supporting structure 120 essentially consists of a single curved portion curving in one direction only when viewed front-on (as in FIG. 11). Thus the structure 120 has at its root (join 160) a local dihedral of about 0 degrees, which gradually increases to about +90 degrees at its tip (an average change of almost 10 degrees for every 10% step along the length of the supporting structure 120. The change in dihedral is however gentle (with no sharp corners) such that the maximum change in angle over any 10% of the length of the supporting structure 120 is less than 25 degrees.

The relative changes in curvature of the supporting structure 120 as compared to the second curved portion 113 of the main aerofoil 110 creates a large airflow channel 140 between the main aerofoil 110 and the supporting structure 120. The supporting structure 120 having a single curved portion has a benefit in how it performs as a structural support, in comparison to a supporting structure having more than one curved portion. The geometry of the main aerofoil 110 and the supporting structure 120 thus defining a large airflow channel 140 may have multiple benefits. The supporting structure 120 can support an increased amount of the mass of the main aerofoil 110, by following a structurally strong curve, which terminates at a vertically extending end which meets the main aerofoil 110 at an angle which is 90 degrees or close thereto (i.e. substantially perpendicular). The supporting structure supporting a greater amount of the weight of the main aerofoil 110, enables the main aerofoil 110 and the wing tip device 1 to be lighter. By having a large airflow channel 140, drag is decreased in comparison to a smaller airflow channel.

It will be noted that the wing tip device 100 according to the embodiment shown in FIG. 11 has the main aerofoil 110 as the upper section, and the supporting structure 120 as the lower section. The supporting structure 120 according to this embodiment is joined to the main aerofoil 110 at the join 160 located on the bottom surface of the main aerofoil 110. The inventors have found that in aircraft wing tips there is supersonic airflow on the top surface of the main aerofoil and subsonic airflow on the bottom surface of the main aerofoil. Having a junction, such as a join, in the supersonic airflow on the top surface of the main aerofoil has been found to induce more drag than having a junction on the bottom surface of the main aerofoil. Providing a "clean" top surface of the main aerofoil and having the join 160 on the bottom surface of the main aerofoil has been found to reduce drag in comparison to arrangements where the main aerofoil forms a lower section supported by supporting structure as the upper section (imagine a braced sharklet structure for example)

The inboard end 155 of the wing tip device 100 attaches to an outboard end of a fixed wing of an aircraft (not shown). The root portion 150 of the wing tip device 100 is a continuation of the outboard end of the fixed wing of the aircraft. The root portion 150 of the wing tip device has the same sweep, cant angle and angle of attack as the outboard end of the fixed wing of the aircraft. The leading edge of the root portion 150 of the wing tip device is a continuation of the leading edge of the outboard end of the fixed wing of the aircraft. The trailing edge of the root portion 150 of the wing tip device is a continuation of the trailing edge of the outboard end of the fixed wing of the aircraft.

The supporting structure 120 attaches to the root of the main aerofoil at a point which is in the same plane as the wing. Each supporting structure 120 has a mass of the order of at least 30 kg (optionally, in the range of 25 kg to 40 kg). By comparison, the main aerofoil may have a mass of the order of at least 80 kg.

Figure 16:
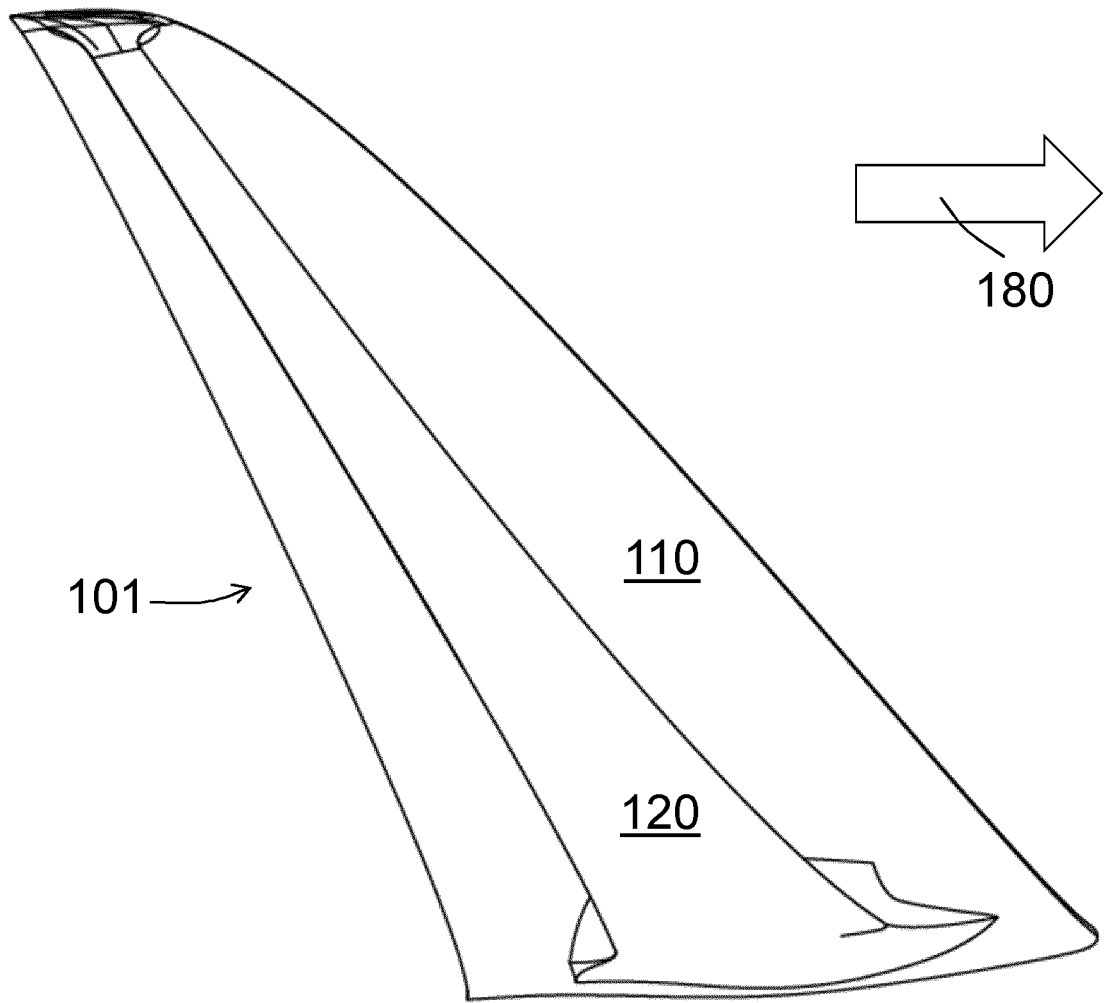
FIG. 16 shows a perspective view of the wing tip device from the outboard side looking down the centreline of the wing according to the fifth embodiment of the invention.
Figure 17:
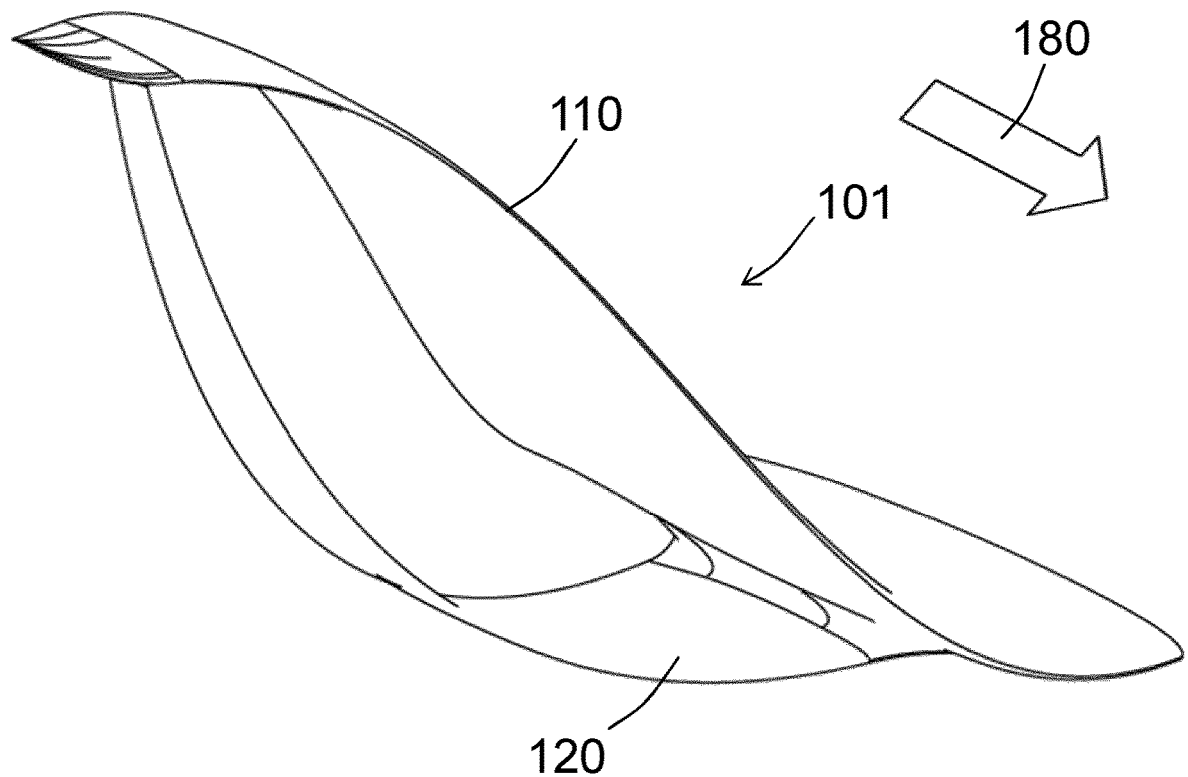
FIG. 17 shows a further perspective view of the wing tip device according to the fifth embodiment of the invention.
Figure 18:
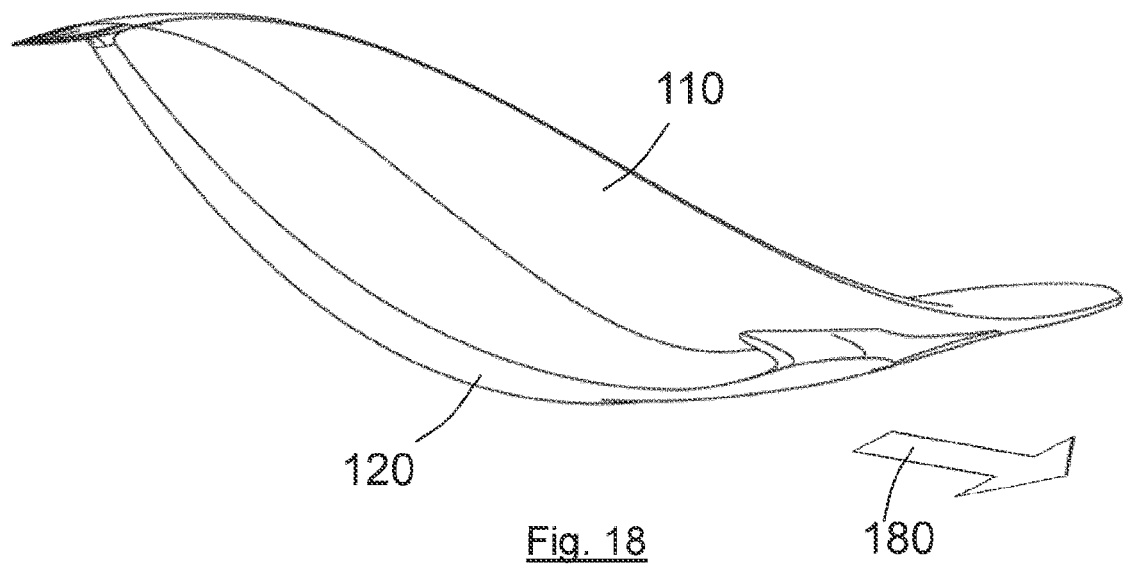
FIG. 18 shows a yet further perspective view of the wing tip device according to the fifth embodiment of the invention.

FIGS. 12 to 18 show perspective views of the wing tip device 101 of a starboard aircraft wing with the direction of flight being indicated by the arrow 180. It will be seen from FIGS. 14 and 16 that the trailing edge of the supporting structure 120 does not extend rearwards of the trailing edge of the main aerofoil 110. Also, as shown in FIG. 16, the main aerofoil 110 entirely overlays the supporting structure 120 when viewed along the centreline of the wing.

By way of a brief summary, it will be seen that embodiments of the invention are able to provide an aircraft wing tip device with a sigmoid shaped (e.g. S-shaped) aerofoil structure blending in with a main wing of the aircraft. The aerofoil structure may be braced with a structural support such as a curved aerodynamically shaped structural support or strut, that is located beneath. The main aerofoil and structural support together form a closed loop wing tip device. The upper aerofoil reduces the drag that would otherwise be induced by wingtip vortices. The curved strut may include one or more actuators for changing the shape of the wing tip device so as to morph from a first geometrical configuration which suits a flight plan to a second geometrical configuration in which the wing tip devices are set up to suit a different flight plan. A further example will now be described.

According to an embodiment of the present invention (not illustrated separately), the structural support may comprise an actuator. The shape of the main aerofoil 110 can be adapted. The structural support 120 may comprise an actuator, wholly contained within its shape, as shown in FIG. 11 to 18. For example, the lower structural support may comprise two integrally formed cable systems which are arranged within the structure of the structural support in such a way as to enable its shape to be deformed elastically under the control of the cable systems, and thus cause a change in geometry of the upper main aerofoil. The integrated cable systems may be designed to be adjusted by ground crew when attending to the aircraft when on the ground and stationary. Once the geometry of the wingtip device has been set up by ground crew by means of making adjustments to the integrated cable systems and the aircraft is moving, the setup of the wingtip device, insofar as its global geometry is concerned, is fixed and cannot be altered or controlled by the pilot during flight. A first configuration of the wingtip device might require the tension in each cable system to be approximately equal, at about 250 N.

Further, different configurations, may require the cable systems to be under increased tension for example each exerting a tension of about 500 N, resulting in the tip of the support structure to be drawn more inboard with a consequent movement of the tip of the upper main aerofoil inboard also. There may be a case where one of the cable systems has a tension (for example 100 N) significantly lower than the tension in the other of the cable systems (for example 700 N), causing a twist. There may be portions on the wingtip device which are moved by more than 50 mm as between such different configurations. The movement from one configuration to another may be such that the wingtip device is deformed elastically and is thus able to return to its previous shape, as and when the internal stresses are returned to their previous values. The extent of the cable systems in the (lower) support member may follow a path that curves. The curvature of that path can change as between the various configurations of the wingtip device. Such a curvature, and changes in curvature, can be accommodated by means of the cable passing via channels, pulleys, wheels or the like.

Figure 19:
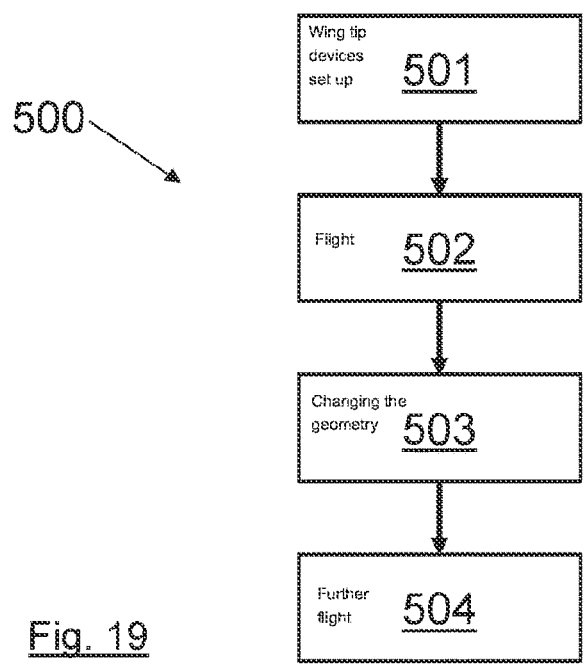
FIG. 19 shows a flowchart of the steps of a method according to a sixth embodiment of the invention.

FIG. 19 illustrates a flowchart of 500 illustrating a method according to a sixth embodiment of the invention. The aircraft may be one as shown in FIG. 1 incorporating wingtip devices of an embodiment of the invention. As a first step 501 the wingtip devices are set up so as to be suitable for a short haul flight, in which the time the aircraft is expected to fly at cruising altitude is around 30 minutes. The aircraft undertakes the flight (step 502). When back on the ground, the wingtip devices are adjusted by means of changing the geometry of the wingtip devices (as in step 503) so as to be more suited to a longer flight. This step may include imparting a twisting force in the wingtip device to provide a different aerodynamic profile at the wingtip. The aircraft then undertakes a further flight (step 504), in which the aircraft flies at cruising aptitude for three hours or longer. The fuel efficiency of the aircraft when set up in the first configuration is better for the first flight and it would be for the second flight if retained in that first for configuration. Likewise, the fuel efficiency of the aircraft when set up in the second configuration is better for the second flight than it would be for the first flight if retained in that second configuration.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

It will be appreciated that the wingtip device shown in the Figures might include fairings and/or additional fairing services in order to smooth out any sharp changes in curvature. The wingtip device according to the second (or fifth?) embodiment may be a closed surface wingtip device without any other parts protruding from the smoothly faired structure that provides the closed surface.

There may be features of the above described embodiments that have benefit independently of a wing tip device with an upper aerofoil surface forming a closed loop blended wing tip device (in which the upper and lower aerofoil surfaces are similarly dimensioned). For example, there may be embodiments of the invention where a (for example, sharklet-type) winglet has a shape which can be morphed using a moveable bracing structure (with associated integrated actuators for example) that extends from an inboard portion of the winglet to an outboard portion of the winglet. Such a bracing structure may be so shaped that it has a maximum chordwise dimension at a location immediately above a portion of the winglet structure which has a chordwise dimension at least twice the size. Additionally or alternatively, such a bracing structure may be so shaped that its chordwise dimension at the midpoint along its spanwise length, is less than half of the chordwise dimension of the winglet structure at the location immediately below. Additionally or alternatively, such a bracing structure may have an average chordwise dimension (along its spanwise length) which is less than half the average chordwise dimension (along its spanwise length) of the winglet structure.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. The term 'or' shall be interpreted as 'and/or' unless the context requires otherwise.

The invention claimed is:

1. A closed surface wing tip device for an aircraft, wherein the wing tip device includes an element comprising an actuator disposed within the wing tip device, wherein the element is configured to exert varying forces within the structure in a direction parallel with a spanwise direction of the wing to deform the shape of the wing tip device from a first geometrical configuration to a second geometrical configuration with different aerodynamic properties from the first geometrical configuration.

2. A device according to claim 1, wherein the element is arranged to deform the overall shape of the wing tip device by means of an elastic deformation.

3. A device according to claim 1, wherein the element is arranged to exert a range of forces wherein the difference between the maximum force and the minimum force is greater than 100N.

4. A device according to claim 1, wherein the closed surface of the wing tip device comprises
a lower section being in the form of a winglet having a first portion having a first dihedral angle and a second portion, outbound of the first portion, which has a second dihedral angle which is at least 30 degrees more than the first positive dihedral angle, and
an upper section which extends from a region in the first portion of the lower section to a region in the second portion of the lower section, and which forms with the lower section the closed surface.

5. A device according to claim 4, wherein the first portion of the lower section has a dihedral angle of less than +20 degrees and the second portion has a dihedral angle of greater than +60 degrees over a spanwise length of more than 500 mm.

6. A device according to claim 4, wherein the winglet forming the lower section of the closed surface of the wing tip device has a height of at least 500 mm.

7. A device according to claim 4, wherein the upper section includes a portion having a dihedral angle of greater than +45 degrees over a spanwise length of more than 500 mm.

8. A device according to claim 4, wherein there is a point on the lower surface of the upper section for which the shortest distance to the nearest point on the lower section is greater than 500 mm away.

9. A device according to claim 4, wherein the upper section has a mass of greater than 10 Kg.

10. A device according to claim 1, wherein the shape of the wing tip device is arranged to be deformed with two degrees of freedom.

11. An aircraft wing incorporating or otherwise comprising a wing tip device according to claim 1.

12. An aircraft wing, comprising:
a main body,
a winglet at an outboard end of the wing, the winglet having an planar portion spaced apart from the main body by a blended transition region which is shaped such that the curvature of the local dihedral increases in the outboard direction and
an upper aerofoil structure extending between a position outboard of a location between the planar portion and the blended transition region to a position inboard of the location between the planar portion and the blended transition region, and
a closed loop at the wing tip formed at least in part by at least part of the winglet and at least part of the upper aerofoil structure,
the upper aerofoil structure having an actively controllable shape and/or length, which acts in use to manipulate the shape of the winglet by loading the winglet to cause elastic deformation of the winglet from a first aerodynamic configuration suitable for a short-haul flight over a first distance to a second different aerodynamic configuration better suited for a flight over a second distance different from the first difference,
wherein the upper aerofoil structure comprises at least one integrally formed actuating system configured to exert varying forces within the structure in a direction parallel with a spanwise direction of the wing to enable deforming the shape of the upper aerofoil structure.

13. An aircraft comprising a wing according to claim 12.

14. An aircraft wing comprising:
a main body having an outboard end, and
a wing tip device extending from the outboard end of the main body of wing, the wing tip device comprising a main aerofoil, the main aerofoil having a first portion extending across at least 25% of the total length of the wing tip device, and a second portion outboard of the first portion, and extending across at least 25% of the total length of the wing tip device,
the first portion being shaped such that the angle of the local dihedral varies monotonically from a value of less than +20 degrees at an inboard location to a value of greater than +50 degrees in the outboard direction,
the second portion being shaped such that the angle of the local dihedral varies monotonically from a value of greater than +50 degrees at an inboard location to a value of less than +20 degrees in the outboard direction, and wherein the main aerofoil of the wing tip device is braced by means of a supporting structure below the main aerofoil extending from the first portion.

15. An aircraft wing according to claim 14, wherein the magnitude of the rate of change of the dihedral angle with increasing distance in the outboard direction is such that the maximum variation in angle over any portion of the main aerofoil extending along 10% of the length of the main aerofoil is less than 30 degrees, the first portion and the second portion are joined by an intermediate, planar, portion extending across between 10% and 30% of the total length of the main aerofoil, the main aerofoil terminates at a horizontal tip, and the angle of the greatest local dihedral of the main aerofoil of the wing tip device is less than 75 degrees.

16. An aircraft wing according to claim 14, wherein the main aerofoil of the wing tip device has a sigmoidal shape when viewed in a line-of-flight direction.

17. An aircraft wing, comprising:

a main body having an outboard end, and a wing tip device extending from the outboard end of the main body of wing, the wing tip device comprising a main aerofoil, the main aerofoil having a first portion extending across at least 25% of the total length of the wing tip device, and a second portion outboard of the first portion, and extending across at least 25% of the total length of the wing tip device, the first portion being shaped such that the angle of the local dihedral varies monotonically from a value of less than +20 degrees at an inboard location to a value of greater than =degrees in the outboard direction, the second portion being shaped such that the angle of the local dihedral varies monotonically from a value of greater than +50 degrees at an inboard location to a value of less than +20 degrees in the outboard direction, wherein the main aerofoil of the wing tip device is braced by means of a supporting structure below the main aerofoil extending from a position inboard of the first portion to the second portion or a position outboard of the second portion.

\* \* \* \* \*